(12) United States Patent
Kazar

(10) Patent No.: US 9,405,487 B2
(45) Date of Patent: *Aug. 2, 2016

(54) MEDIA AWARE DISTRIBUTED DATA LAYOUT

(71) Applicant: Michael L. Kazar, Pittsburgh, PA (US)

(72) Inventor: Michael L. Kazar, Pittsburgh, PA (US)

(73) Assignee: Avere Systems, Inc., Pittsburgh, PA (US)

( * ) Notice: Subject to any disclaimer, the term of this patent is extended or adjusted under 35 U.S.C. 154(b) by 184 days.

This patent is subject to a terminal disclaimer.

(21) Appl. No.: 14/175,801

(22) Filed: Feb. 7, 2014

(65) Prior Publication Data

US 2014/0156928 A1    Jun. 5, 2014

Related U.S. Application Data

(63) Continuation of application No. 13/493,701, filed on Jun. 11, 2012, now Pat. No. 8,655,931, which is a continuation of application No. 12/218,085, filed on Jul. 11, 2008, now Pat. No. 8,214,404.

(51) Int. Cl.
| | | |
|---|---|---|
| G06F 17/30 | (2006.01) | |
| G06F 3/06 | (2006.01) | |
| G06F 12/10 | (2016.01) | |
| G06F 12/14 | (2006.01) | |

(52) U.S. Cl.
CPC ............ *G06F 3/0667* (2013.01); *G06F 3/0605* (2013.01); *G06F 3/067* (2013.01); *G06F 3/0619* (2013.01); *G06F 3/0643* (2013.01); *G06F 3/0689* (2013.01); *G06F 12/1036* (2013.01); *G06F 17/30171* (2013.01); *G06F 17/30182* (2013.01); *G06F 12/109* (2013.01); *G06F 12/145* (2013.01); *Y10S 707/956* (2013.01)

(58) Field of Classification Search
CPC . G06F 12/1036; G06F 3/0605; G06F 3/0619; G06F 3/0643; G06F 3/0667; G06F 3/067; G06F 3/0689
USPC .......................................... 707/797, 829, 831
See application file for complete search history.

(56) References Cited

U.S. PATENT DOCUMENTS

| | | | | |
|---|---|---|---|---|
| 5,537,400 A | * | 7/1996 | Diaz ................... | H04L 12/5601 370/396 |
| 5,682,477 A | * | 10/1997 | Wakamiya .............. | H04L 12/14 705/30 |
| 6,665,740 B1 | * | 12/2003 | Mason, Jr. ........... | G11B 27/002 348/E5.008 |
| 6,904,470 B1 | * | 6/2005 | Ofer ........................ | G06F 3/061 710/6 |
| 7,093,038 B2 | * | 8/2006 | Ghosh .................... | G06F 3/061 710/62 |
| 7,509,329 B1 | * | 3/2009 | Leverett ................ | G06F 3/0605 707/999.003 |
| 7,594,049 B1 | * | 9/2009 | Jain ......................... | G06F 3/061 370/355 |
| 7,849,057 B1 | * | 12/2010 | Kazar ............... | G06F 17/30088 707/637 |
| 2002/0129123 A1 | * | 9/2002 | Johnson .............. | H04L 65/4084 709/219 |
| 2002/0133491 A1 | * | 9/2002 | Sim ................... | G06F 17/30067 707/E17.01 |

(Continued)

*Primary Examiner* — Phong Nguyen
(74) *Attorney, Agent, or Firm* — Ansel M. Schwartz

(57) ABSTRACT

A storage system includes a plurality of vdisks, with each vdisk containing a plurality of storage segments, and each segment providing a specific class of service (CoS) for storage. Each vdisk stores files with data and meta data distributed among its storage segments. A storage system includes a memory having multiple classes of service. The system includes an interface for storing a file as blocks of data associated with a class of service in the memory. The interface chooses the class of service for a block on a block by block basis for storage. A file system for storing a file. A file system for storing includes a plurality of vdisks. A method for storing a file.

22 Claims, 11 Drawing Sheets

(56) References Cited

U.S. PATENT DOCUMENTS

| | | | | |
|---|---|---|---|---|
| 2003/0233494 A1* | 12/2003 | Ghosh | G06F 3/061 | 710/1 |
| 2004/0141494 A1* | 7/2004 | Beshai | H04L 49/106 | 370/352 |
| 2004/0177220 A1* | 9/2004 | Yamamoto | G06F 3/061 | 711/114 |
| 2004/0236798 A1* | 11/2004 | Srinivasan | G06F 17/302 | 707/E17.01 |
| 2005/0102383 A1* | 5/2005 | Sutler | G06Q 30/02 | 709/223 |
| 2005/0192932 A1* | 9/2005 | Kazar | G06F 17/30067 | 707/E17.01 |
| 2005/0246438 A1* | 11/2005 | Menth | H04L 47/11 | 709/224 |
| 2005/0289296 A1* | 12/2005 | Balasubramanian | G06F 3/0605 | 711/114 |
| 2006/0236061 A1* | 10/2006 | Koclanes | G06F 3/0605 | 711/170 |
| 2006/0248088 A1* | 11/2006 | Kazar | G06F 3/0611 | 707/E17.01 |
| 2006/0253678 A1* | 11/2006 | Gusler | G06F 3/0605 | 711/170 |
| 2007/0073781 A1* | 3/2007 | Adkins | G06F 11/1435 | 714/E11.136 |
| 2008/0052329 A1* | 2/2008 | Dodge | G06F 3/0608 | 707/999.205 |
| 2008/0082525 A1* | 4/2008 | Cha | G06F 17/301 | 707/999.005 |
| 2008/0189343 A1* | 8/2008 | Hyer | G06F 3/0614 | 707/999.205 |

* cited by examiner

400# MEDIA AWARE DISTRIBUTED DATA LAYOUT

CROSS-REFERENCE TO RELATED APPLICATIONS

This is a continuation of U.S. patent application Ser. No. 13/493,701 filed Jun. 11, 2012, now U.S. Pat. No. 8,655,931, which is a continuation of U.S. patent application Ser. No. 12/218,085 filed Jul. 11, 2008, now U.S. Pat. No. 8,214,404 issued Jul. 3, 2012, all of which are incorporated by reference herein.

FIELD OF THE INVENTION

The present invention is related to the storage of a file system on a plurality of segments, each of which has a different class of service. (As used herein, references to the present invention" or "invention" relate to exemplary embodiments and not necessarily to every embodiment encompassed by the appended claims.) Additionally, the present invention constructs said file system from multiple sub-file systems (vdisks), with operations involving multiple vdisks providing atomicity using a persistent operations table to record partial operation state.

BACKGROUND OF THE INVENTION

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

Most file systems today lack certain features useful for supporting mixed types of storage, as well as huge amounts of storage. In addition, most file systems today have meta data bottlenecks that limit their performance scaling in multi-core and distributed systems. The invention presented here is a novel file system implementation addressing these issues.

BRIEF SUMMARY OF THE INVENTION

This invention divides a file system into a number of pools of inodes, otherwise called vdisks, and within each inode pool, data is stored in multiple segments, each potentially with a different class of service. Automated policies can choose the appropriate segment for different files, or even different portions of a file, chosen either statically or dynamically.

Each inode pool can be served by a separate processor in a multiprocessor system, limiting the amount of inter-processor communication within a file system to communication between inode pools. And each inode pool can be checked for consistently independently, greatly reducing the amount of computation and IO operations required to recover from even a severe system failure or software bug resulting in file system inconsistency, since only the inode pool with the detected inconsistency needs to be checked and repaired.

The present invention pertains to a storage system. The system comprises a memory having a first segment for storing data having a first class of service, and at least a second segment for storing data having a second class of service which is different than the first class of service of the first segment. The system comprises an interface which receives a file and stores a first portion of the file in the first segment and a second portion of the file on the second segment, and retrieves a file by reading the first portion and the second portion from the first and second segment, respectively.

The present invention pertains to a storage system. The system comprises a plurality of vdisks, with each vdisk containing a plurality of storage segments, and each segment providing a specific class of service (CoS). Each vdisk stores files with data and meta data distributed among its storage segments.

The present invention pertains to a storage system. The system comprises a memory having multiple classes of service. The system comprises an interface for storing a file as blocks of data associated with a class of service in the memory. The interface chooses the class of service for a block on a block by block basis.

The present invention pertains to a file system for storing a file. The system comprises a plurality of vdisks, with each vdisk having a plurality of Modes. Each Mode of each vdisk stores data on one or more segments, with each segment having a different class of service. The system comprises a controller which stores data of a file in an inode of a vdisk, in one or more segments of that vdisk The present invention pertains to a file system for storing a file; the system comprises a plurality of vdisks, and each vdisk having a plurality of Modes. The system comprises a controller including a plurality of processors, with each processor serving one or more of the vdisks.

The present invention pertains to a file system for storing files. The system comprises a plurality of vdisks, with each vdisk having a plurality of Modes, a plurality of Modes of at least one vdisk storing data on a plurality of segments, each segment having a different class of service. The system comprises a controller which stores data of the file in one or more segments of one vdisk.

The present invention pertains to a method for storing a file. A method comprises the steps of receiving the file at an interface. There is the step of storing data of the file with a controller in one or more segments of one vdisk of a plurality of vdisks, each vdisk having a plurality of Modes. The plurality of Modes of at least one vdisk, store data in a plurality of segments, with each segment having a different class of service.

The present invention pertains to a method for storing a file. The method comprises the steps of receiving the file at an interface. There is the step of storing a first portion of the file in a first segment of a memory and a second portion of the file in a second segment of the memory. There is the step of retrieving the file by reading the first portion and the second portion from the first and second segment, respectively.

BRIEF DESCRIPTION OF THE SEVERAL VIEWS OF THE DRAWING

In the accompanying drawings, the preferred embodiment of the invention and preferred methods of practicing the invention are illustrated in which.

DETAILED DESCRIPTION OF THE INVENTION

Figure 5:
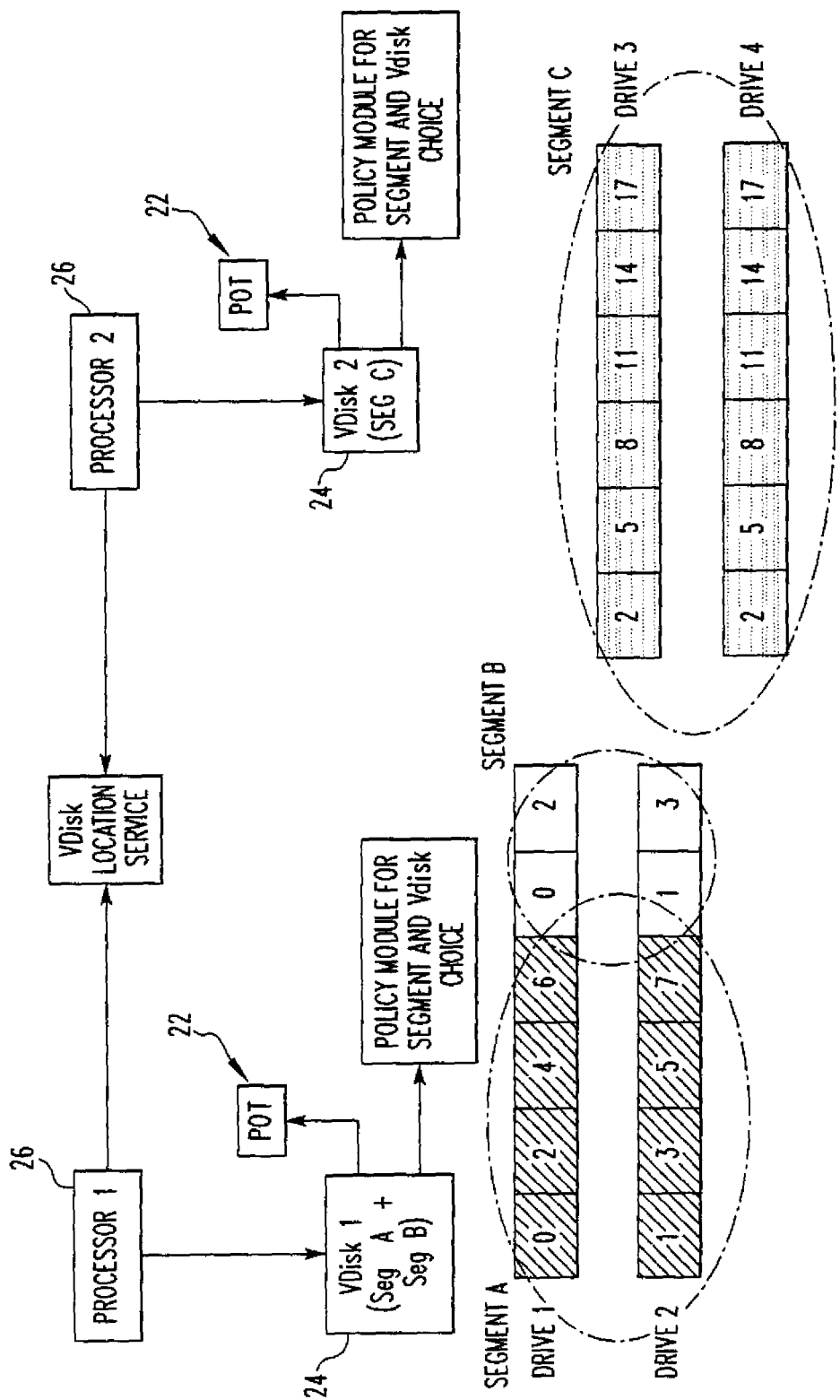
FIG. 5 shows the modular decomposition of the invention, along with the binding of processors to vdisk module instances, and the binding of vdisk instances to the set of drives each vdisk controls.
Figure 14:
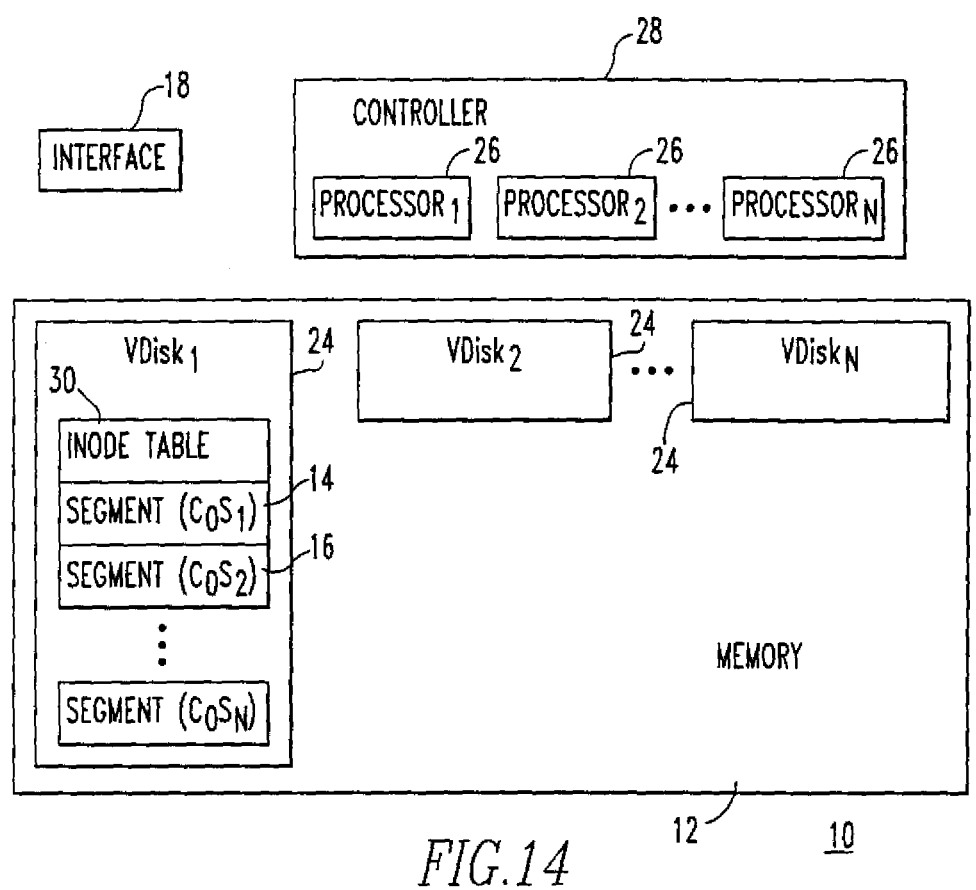
FIG. 14 is a block diagram of the present invention.

Referring now to the drawings wherein like reference numerals refer to similar or identical parts throughout the several views, and more specifically to FIGS. 5 and 14 thereof, there is shown a storage system 10. The system 10 comprises a memory 12 having a first segment 14 for storing data having a first class of service, and at least a second segment 16 for storing data having a second class of service which is different than the first class of service of the first segment 14. The system 10 comprises an interface 18 which receives a file and stores a first portion of the file in the first segment 14 and a second portion of the file on the second segment 16, and retrieves a file by reading the first portion and the second portion from the first and second segment 14, 16, respectively.

The interface 18 can store the file within one or more stripes of data in the first segment 14 and within one or more stripes of data in the second segment 16. The system 10 can include a plurality of disks 20 and wherein the interface 18 stores each segment as a plurality of data chunks distributed among several disks 20. The segment can include a parity strip and the interface 18 stores the parity strip in the memory 12 according to RAID techniques so if any one strip is unavailable, the data blocks can still be retrieved from the other strips and the parity strip. The Mode describing a file includes meta data which keeps track of the first portion and the second. The meta data is preferably a Unix-style indirect block tree.

The present invention pertains to a storage system 10. The system 10 comprises a plurality of vdisks 24. Each vdisk 24 contains a plurality of storage segments, with each segment 24 providing a specific class of service (CoS). Each vdisk 24 stores files with data and meta data distributed among its storage segments.

A first portion of the file data can be stored in a first segment 14, and a second portion of the file can be stored in either the first segment 14 or a second segment 16. The system 10 can include a plurality of vdisks 24, and where a vdisk 24 to hold a newly created file or directory is chosen from the plurality of vdisks 24 based on a predetermined mapping into the plurality of vdisks 24 in the storage system 10. The predetermined mapping can be a round-robin assignment algorithm. The predetermined mapping can choose the vdisk 24 with a largest available space, or a largest percentage of available space.

The system 10 can include a plurality of processors 26 and wherein the predetermined mapping chooses the vdisk 24 served by a least loaded processor 26. Each vdisk 24 can be a random collection of directories and files, and at least one file is stored in at least two segments. Each vdisk 24 can be a random collection of directories and files, and at least two vdisks 24 hold at least one file. The system 10 can include an interface 18 to initiate a file system 10 consistency check on an individual vdisk 24, triggered by an indication of an inconsistency in a specific vdisk 24.

The present invention pertains to a storage system 10. The system 10 comprises a memory 12 having multiple classes of service. The system 10 comprises an interface 18 for storing a file as blocks of data associated with a class of service in the memory 12, with the interface 18 choosing the class of service for a block on a block by block basis.

The present invention pertains to a file system 10 for storing a file. The system 10 comprises a plurality of vdisks 24, with each vdisk 24 having a plurality of Modes. Each mode of each vdisk 24 stores data on one or more segments, with each segment having a different class of service. The system 10 comprises a controller 28 which stores data of a file in an Mode of a vdisk 24, in one or more segments of that vdisk 24.

The system 10 can include a plurality of processors 26, with each processor 26 serving at least one of the vdisks 24. Each segment can have a plurality of chunks. Each segment can have chunks added to it dynamically over time. Each vdisk 24 can include an Mode table 30 describing each file in the vdisk 24. One of the vdisks 24 is preferably a root vdisk 24. One of the Modes in the root vdisk 24 is preferably a root Mode of the file system 10. The system 10 can include at least one directory storing mappings of file names to Mode pointers. Each mode can have a back pointer to the directory entry pointing to the Mode.

The file system 10 described in this invention is preferably a tree, with a single top-most directory, containing a mix of files and directories. Each other directory also contains a set of files and other directories. So, the root Mode is the topmost Mode in the file system 10 tree, and the only directory that doesn't have a parent directory.

Directories, including the root directory, are just normal files, marked with a special file type so that they can't just be read and written by users, but can instead only have directory operations like "create file in directory" performed on them. But, like normal files, they exist in a single vdisk and have their data blocks stored in one or more segments in that vdisk.

The present invention pertains to a file system 10 for storing a file. The system 10 comprises a plurality of vdisks 24, with each vdisk 24 having a plurality of Modes. The system 10 comprises a controller 28 including a plurality of processors 26, with each processor 26 serving one or more of the vnodes.

The present invention pertains to a file system 10 for storing a file. The system 10 comprises a plurality of vdisks 24, with each vdisk 24 having a plurality of Modes, a plurality of Modes of at least one vdisk 24 storing data on a plurality of segments, each segment having a different class of service. The system 10 comprises a controller 28 which stores data of the file in multiple segments of one vdisk 24.

The present invention pertains to a method for storing a file. A method comprises the steps of receiving the file at an interface 18. There is the step of storing data of the file with a controller 28 in multiple segments of one vdisk 24 of a plurality of vdisks 24. Each vdisk 24 stores a plurality of Modes. At least one inode of at least one vdisk 24 stores data in a plurality of segments, each segment having a different class of service.

The present invention pertains to a method for storing a file. The method comprises the steps of receiving the file at an interface 18. There is the step of storing a first portion of the file in a first segment 14 of a memory 12 and storing a second portion of the file in a second segment 16 of the memory 12. There is the step of retrieving the file by reading the first portion and the second portion from the first and second segment 14, 16, respectively.

Figure 1:
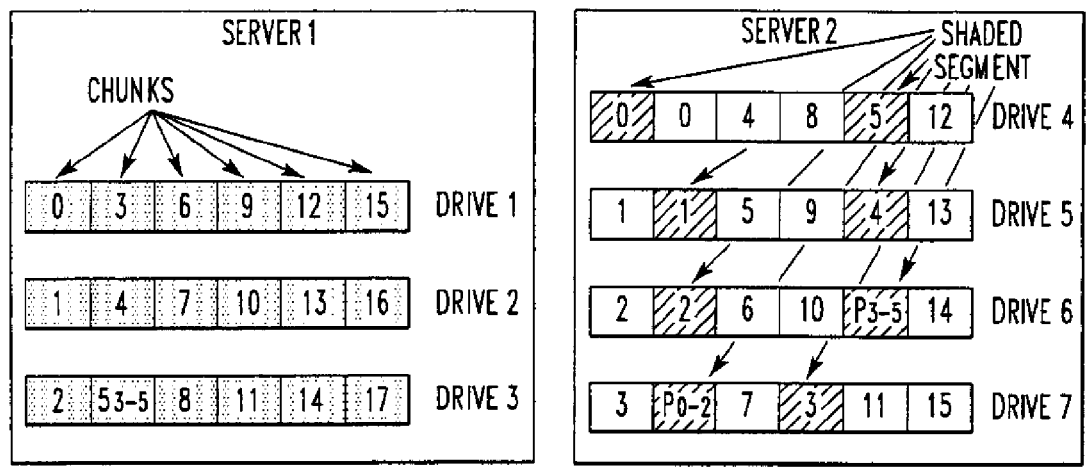
FIG. 1 shows two servers, each with multiple drives, with each drive holding multiple chunks. Some chunks hold file system data, while others store RAID parity information.

In the operation of the invention, physical disks 20 and/or RAID arrays are divided into fixed sized chunks of storage with identical or very similar performance and reliability characteristics. These chunks may store data or parity (or checksum) information. These chunks are combined into variable sized segments, each segment providing a linear disk block address space, as well as a meta data description of the class of storage provided, including RAID class, average seek time, and read and write data transfer rates. Chunks may be combined into segments by simple concatenation, as shown by the diamond or horizontally marked segments in FIG. 1, in which chunks are concatenated sequentially in the order of their tag. Chunks may also be combined with RAID parity protection, as shown by the diagonally marked or shaded segments in the same figure, where, in these examples, every three chunks of data is stored with an additional parity chunk that stores the RAID 5 parity information for those three chunks. In the case of segments with parity chunks, the parity data is not included in the segment's linear address space, so that the linear address is comprised of the concatenation of the data chunks only. For example, the linear address space of the shaded segment in FIG. 1 is comprised of the ordered set of chunks {0, 1, 2, 3, 4, 5}.

A chunk is the smallest part of the disk that we *assign* to one segment or another. A block, on the other hand, is the smallest addressable part of a disk for the purposes of doing *I/O*. That is, we do disk space allocation in units of chunks, but we do individual reads and writes at a more granular level.

Segments are a simple block storage concept, and are combined into sparse linear address spaces called vdisks 24. Different segments within a vdisk 24 may have varying storage types. A vdisk 24 also includes an inode table 30, with each entry identified by a 64 bit inode ID, specifying the inode within the vdisk 24. Within a vdisk 24, any inode's data or meta data blocks may be stored on any of the segments within the vdisk 24. For example, a policy might specify that the first megabyte of every file is allocated from a segment with very low latency, with the remaining blocks allocated from segments stored on storage with higher latencies.

A file system 10 comprises multiple vdisks 24. One vdisk 24 is designated the root vdisk 24, and a designated inode within that vdisk 24 represents the root of the entire file system 10. The set of the inodes within the file system 10 is then the union of all of the inodes in all of the file system's 10 vdisks 24.

Directories store mappings from file names (represented as UTF-8 strings, without loss of generality) to (vdisk 24, inode) pairs. Each inode has a back pointer (or a set of back pointers) to the directory entry or entries pointing to the inode, to help in validating the directory entry. These back pointers also allow directory reconstruction by scanning for inodes stored in the directory, and can also be used in generating path names from inodes.

In FIG. 1, each small box is a chunk of storage, allocated from a drive represented by a horizontal box. FIG. 1 contains two logical servers, possibly residing within the same computer system, the first of which supports three drives, and the second of which supports four drives. Each logical server provides storage for the chunks making up one or two segments. Each segment is striped among that server's drives: server 1 stores chunks from the dotted segment, and server 2 stores chunks from the shaded and white segments. Each segment provides storage with a different class of service: the dotted segment on sever 1 provides RAID 0 storage; the shaded segment on sever 2 provides RAID 5 storage, and the white segment on server 2 provides additional RAID 0 storage.

Note that RAID is implemented in this figure across chunks stored on different drives, rather than across multiple drives in their entirety. This means that for RAID segments, some of the segment's chunks store parity information instead of file system data. For example, drive 7's leftmost shaded chunk stores parity information for chunks 0, 1 and 2 for the shaded segment, and drive 6's rightmost shaded chunk stores parity information for the shaded segment's chunks 5, 4 and 3.

Figure 2:
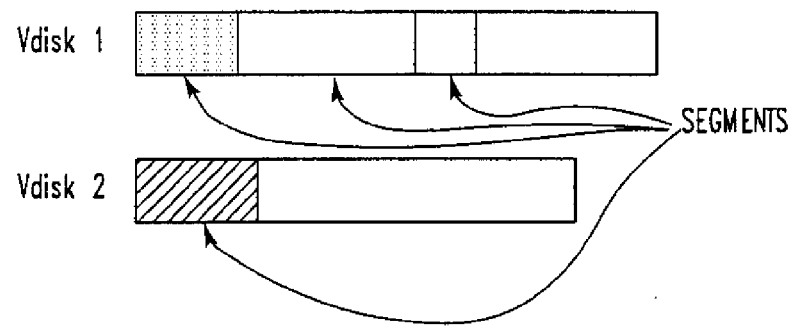
FIG. 2 shows the construction of vdisk block address spaces from one or more segments.

FIG. 2 shows the shaded, white and dotted chunks being combined into shaded, white and dotted segments. The dotted and white segments make up the block address space for vdisk 1, so that files whose inodes are stored on vdisk 1 can have blocks placed on either of the these segments, as the class of service policies for that file dictate. This invention's ability to aggregate multiple types of segments in a single vdisk 24 allows the dynamic allocation of storage with a desired CoS to portions of a file. Vdisk 2 consists of only the shaded segment. In common practice, when creating separate vdisks 24 for scalability and fault isolation reasons, each vdisk 24 would typically be comprised of sets of similarly typed segments.

Each vdisk 24 provides a separate inode space, and in this example, the two vdisks 24 are combined into a single file system name space. The root is a specially designated inode in a designated vdisk 24, and files are allocated out of each vdisk 24 on either a random, or a policy-driven, basis as new files and directories are created. It is not expected to move files between vdisks 24 frequently, or even transparently; changing the class of service of all or part of a file is accomplished not by changing a file's vdisk 24, but by migrating a file's individual blocks to those segments within the file's original vdisk 24 providing the desired class of service. Overall load balancing can be accomplished by moving the responsibility for processing entire vdisks 24 between processors 26 or systems 10.

Note that vdisk 1 is actually comprised of storage (segments) controlled by both server 1 and server 2. A file allocated on vdisk 1 could have its blocks allocated half from the diagonally marked segment, and half from the shaded segment. When vdisk 1's owner needs to read or write data on another logical server, it does so by sending a request to that server to perform the read or write operation on its behalf. This flexibility allows one to build loosely coupled servers serving a single file system 10.

In other words, vdisks 24 have owning processes that control the meta data operations for all segments within that vdisk 24. Each segment has its own controlling process performing its basic read and write operations. In some cases, the process controlling a vdisk 24 is the same as the process controlling all of that vdisk's 24 segments, but this need not be the case in general.

Figure 3:
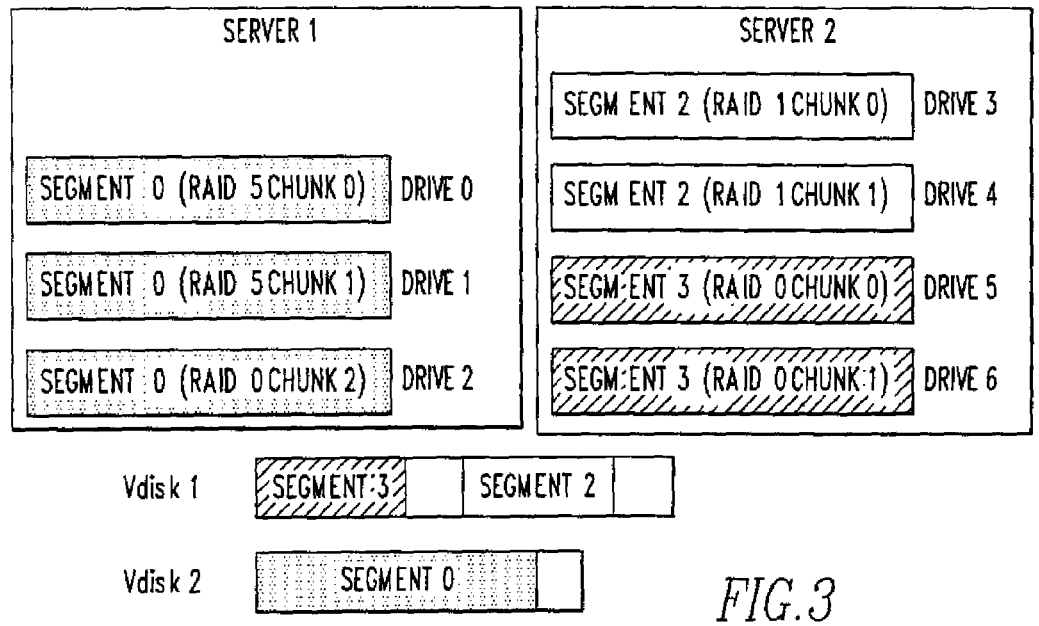
FIG. 3 shows an alternative construction of segments from individual disk drives instead of from chunks of disk drives.

Note that alternative mechanisms for creating segments from disk storage are also possible. For example, FIG. 3 shows segments comprised of entire RAID groups, with each RAID group made from chunks comprised of entire disk drives. As in the previous example, the segments are mapped into the vdisk 24 address space sparsely, to provide room for additional growth in an existing segment.

Figure 4:
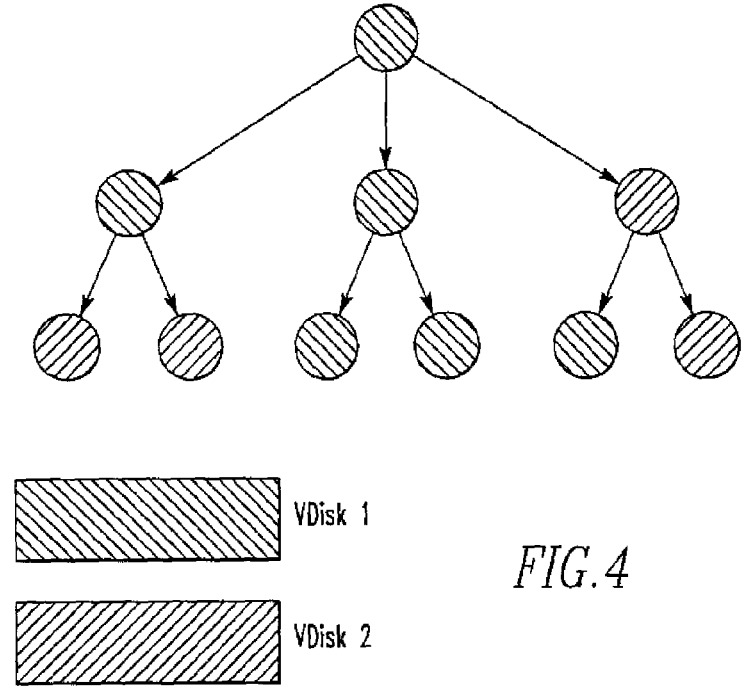
FIG. 4 shows the distribution of files and directories in a file system between multiple vdisks.

FIG. 4 shows the mapping between a file system directory structure and a collection of vdisks 24. In this example, vdisk 1 (the horizontal stripes) holds the root directory, and stores references to another set of directories, some of which are located on the same vdisk 24 and some of which are stored on vdisk 2. Each of those directories in turn store references to some files (in this example), again, some of which are on the same vdisk 24 as the parent directory, and some of which are on a different vdisk 24. In this invention, each object within a directory may be located on any vdisk 24 in the system 10, whether or not it is the same vdisk 24 as holds the directory.

Meta data operations that affect a single file are typically done by a designated vdisk 24 owner, typically updating local or remote (preferentially local) segments containing the appropriate meta data.

This architecture allows several different forms of striping. The files within a directory will typically be striped among multiple vdisks 24, allowing concurrent data and meta data operations on different files within even a single directory. In addition, a file's blocks can be allocated from multiple segments, each controlled by a different server, and allowing multiple processes to perform JO operations for different portions of even a single file.

Aside from meta data operations that affect a single file, some vdisk 24 operations affect multiple files, located in multiple vdisks 24. All of these operations, either affecting one or affecting more than one vdisk 24, are described below.

The implementation of a device to implement the vdisk 24 interface 18 is now described. The vdisk 24 interface 18 plugs into a standard Unix operating system kernel just below the vnode layer, with a thin glue layer mapping incoming vnode calls from the kernel into the vdisk 24 operations described here. This glue layer is described in detail below, but every significant vnode operation has a corresponding vdisk 24 layer operation.

Referring to FIG. 5, a file create followed by a write of new data to the newly created file is described. The figure illustrates a system 10 with two processors 26. Processor 1 has software ownership of drives 1 and 2 (the horizontal boxes below the processor 26), containing two segments, A and B. Segments A and B provide storage to vdisk 1, which stores a subset of the Modes in the single file system 10 exported in this example. Similarly, processor 2 has ownership of drives 3 and 4, which collectively store segment C. Segment C is the sole segment providing storage for vdisk 2, which stores the remainder of the Modes in this exported file system 10. All operations on vdisk 1, segments A and B, and drives 1 and 2, are performed by processor 1, while all operations on vdisk 2, segment C and drives 3 and 4 are performed by processor 2.

Figure 13:
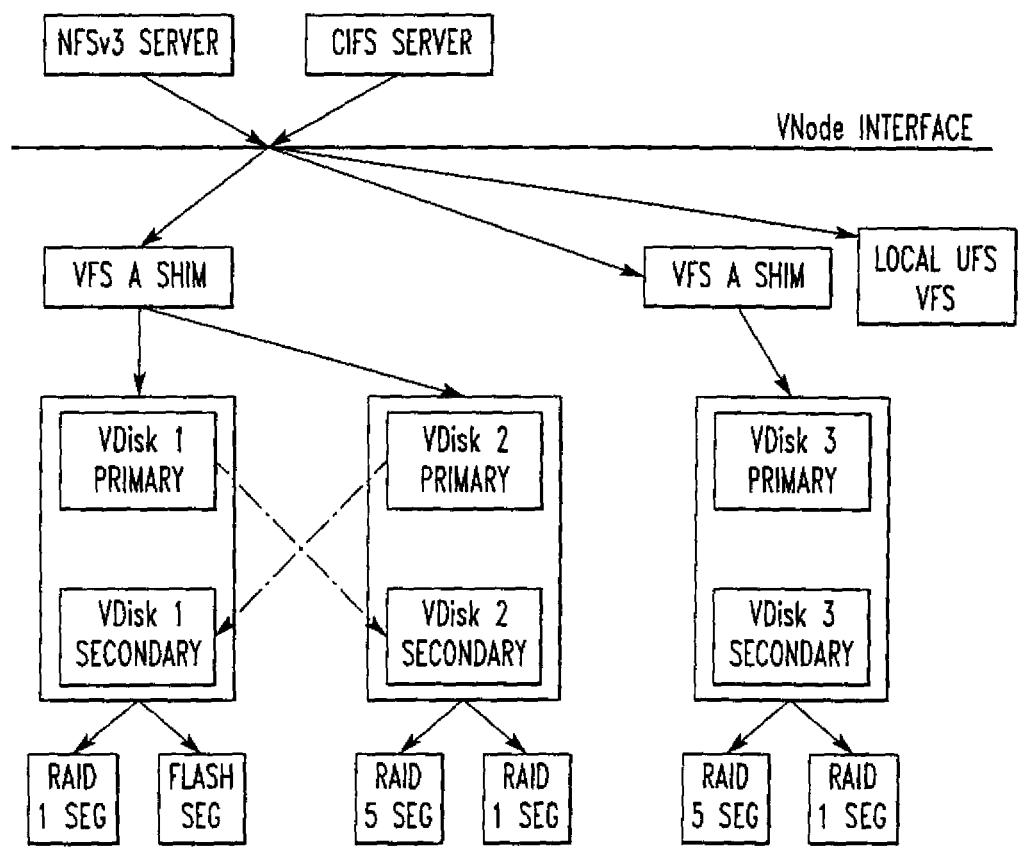
FIG. 13 shows the modules present in a Unix operating system including the vdisk module instances of this invention.

A file create request from the protocol servers (NFSv3 and CIFS servers in FIG. 13), through a vnode shim layer, and finally into the top of the vdisk layer as a file create request contains a file handle identifying the directory in which to create the file, and also contains the name of the file to be created. The create operation returns the file handle of the newly created file. FIG. 13 shows how file system 10 requests enter the system 10.

The file create request begins by consulting a vdisk 24 location service, accessible from any processor 26, to determine the current owner of the target vdisk 24 storing the directory in which the new file is to be created; the target vdisk 24 can be located in a subfield of the incoming directory file handle. The create request is then forwarded to the processor 26 owning this vdisk 24. If it is assumed the target directory resides on vdisk 1, then the file create request begins execution on processor 1.

The vdisk 24 module for vdisk 1 will choose the vdisk 24 to hold the file to be created, based upon policies such as load balancing or balancing the space used by the various vdisks 24. In this example, it is assumed the policy module chooses vdisk 2 to hold the new file. Since the file create operation needs to atomically create a file by changing both the directory's vdisk 24, and the new file's vdisk 24, the create operation begins by creating a transaction entry in the directory vdisk's 24 (vdisk 1's) persistent operations table (POT) 22, storing the parameters of the operation tagged with a unique transaction ID. In the event of a system failure, this information can be used to restart the operation. The first vdisk 24 then sends a perform-object-create operation to the second vdisk 24, with this same transaction ID. The second vdisk 24 now creates a file in its inode table 30, updating storage in segment C. As part of this operation, vdisk 2 creates its own POT 22 entry in its own POT 22, tagged by the same transaction ID, and giving the inode number of the created object. This object's file handle (derived from its inode number) is passed back in the perform-object-create's response to vdisk 1. The create operation in vdisk 1, running again on processor 1, completes the new directory entry so that it stores both the new file name and the newly created file's inode number. It then marks the POT 22 entry for this operation as complete. Cleanup of the POT 22 entries is described below.

As part of creating the directory entry, vdisk 1 needs to update the contents of the new file's parent directory. It does this by updating disk blocks on either segment A or segment B, depending upon the directory's associated storage policy. Similarly, as part of allocating a new object (inode), vdisk 2 allocates an inode by writing to segment C.

This illustrates several key features of this invention. First, the invention's ability to create files on an arbitrary, policy specified, vdisk 24, greatly simplifies load balancing in the system 10, since no administrator defined volume boundaries between vdisks 24 exist. This description also illustrates how a storage policy associated with a directory can guide the vdisk's 24 write operation to choose a storage segment with the desired class of service, allowing a policy to specify a different class of service at as fine a level of granularity as an individual disk block.

Next is described the writing of a block of data to the newly created file. The write request specifies the file to update by file handle. In the example, the write request will be received by an arbitrary processor 26, and since the file was created on vdisk 2, the request will be forwarded to vdisk 2's processor 26, which is processor 2. That processor 26 will call vdisk 2's write operation, which will allocate a block from segment C (the policy module will not have much to do in this case, since there is only one segment to choose from), and then write the updated data to drive 3 or drive 4, as required.

Next, the details of the various vdisk 24 operations provided are examined.

The vdisk 24 operations are divided into three classes. The first set consists of simple operations that affect a single file at a time. The second set consists of operations that read the contents of directories, either to lookup an individual object, or to read the contents of a directory, possibly returning file attributes simultaneously. Finally, a third set of operations consists of operations that modify directories, by creating, deleting or renaming file objects within the directory or directories.

Increased concurrency compared with the state of the art can be obtained for operations in the first set above easily by executing the operations for each vdisk 24 on a separate processor 26. Since these operations require no shared state between different vdisks 24, the operations can execute completely concurrently on separate vdisks 24. Similarly, the second set of operations either operates on a single vdisk 24 as well (the readdir operation), or naturally decomposes into two separate operations which run first on one vdisk 24 and then on another (lookup, readdirplus), which can also run with high concurrency. Even the third set of operations, those that modify one or more directory entries, only affect a small number of vdisks 24 (typically two, but occasionally three or four), meaning that in a system 10 with dozens of vdisks 24, many such operations can run concurrently without creating a bottleneck on a single vdisk 24. Again, this allows considerably improved levels of concurrency, as compared with more centralized file system architectures.

One of the key innovations of this invention is the implementation of directory modifying operations as multi-stage operations, where each stage affects a single vdisk 24, and where the overall operation and its progress is recorded persistently so that the operation is performed atomically, and can complete successfully even if multiple processors 26 involved in the operation repeatedly restart during the operation; this is described further below.

Details of the implementation of these operations are provided below.

The vdisk 24 interface 18 exports a set of simple operations affecting a single file or directory, which are very straightforward to implement in this invention. Each operation is performed on a single file, and reads or updates either the status of the file or its data blocks. Any vdisk 24 implementation that supports inode structures comparable to the FreeBSD operating system's UFS file system can use the inodes stored in a file system 10 as a vdisk 24 implementation for these operations.

The vdisk 24 interface 18 includes the following single file operations:
  getattr—get the attributes of a file
  setattr—change the attributes or file length of a file
  read—read data from a file
  write—update the contents of a file, and update the Mode change time (POSIX file system ctime) and data modification time (POSIX file system mtime) fields simultaneously.
  readdir—read the contents of a directory in a standard format.

The write operation ties into the choice of segment for a file. Specifically, the implementation of a write operation will create dirty buffers in the memory 12 cache that are tagged by the inode identifying the file, and the offset within the file at which the data is located. A background "cleaner" thread within the vdisk 24 module will examine the Mode for its link to a predetermined class of service policy. This policy might be, for example, that the first N megabytes of a file's data should be written to the segment in the vdisk 24 with the lowest read and write latency, and the remaining data should be written to the segment with the largest available free space; this would be an example of a static policy, since the parameters of the policy are defined once, and then followed for multiple files. The cleaner would then allocate blocks of data for the dirty buffers from the vdisk's 24 segments according to the Mode's policy and then write the dirty data to those newly allocated blocks.

A more dynamic policy might write the most heavily accessed small files to a segment comprised of flash, or other low latency storage. In this case, some simple per-inode statistics would need to be gathered by the vdisk 24 manager so that the policies for heavily accessed files could be applied to the correct set of files.

Two vdisk 24 operations, lookup and readdirplus, interpret the contents of a directory, while also returning the attributes associated with one or more files in that directory.

The lookup operation searches the directory for an entry with a specific name, and returns the file's Mode number (which, when qualified with the vdisk's 24 ID, gives the file's file handle), along with the file's attributes. To obtain the file attributes, the implementation of the vdisk lookup operation will send a vdisk 24 getattr call to the vdisk 24 server, and return the attributes of the file along with the rest of the vnode lookup results. Making this call to the vdisk server 24 allows the lookup call to handle the case where the target file is located in another vdisk 24.

Similarly, readdirplus returns a set of file names, along with the attributes of each of the files. Each separate file's attributes may, as in the lookup case, come from a different vdisk 24, and, as with lookup, the attributes for these files come from vdisk 24 getattr cals made to the other vdisk(s) 24.

Neither lookup nor readdirplus make any guarantees about reading the directory and obtaining the file attributes atomically, so the implementation can straightforwardly be done in two steps, first reading the directory's contents, and then obtaining the target file's attributes.

Directory modification operations are considerably more complex, in that they involve modifying multiple vdisks 24 atomically. To implement these multi-stage operations atomically, they are implemented as transactions, and make use of a persistent operations table (the POT 22) in each vdisk 24. The POT 22 entry stores the status of each complex operation, as well as any lock state involved in the operation. Each operation is implemented as a persistent state machine, recording the current state in the persistent operations table (POT 22). For a given operation, each vdisk 24 stores its own POT 22 entry for its portion of the transaction.

Each operation in the POT 22 is assigned a UUID when it first arrives at the first vdisk 24 receiving the vdisk 24 operation; this is called the primary POT 22 entry. The execution of the operation may require sending requests to other vdisks 24 storing other objects modified by this vdisk 24 operation. These are called secondary requests, and their execution at a vdisk 24 may create secondary POT 22 entries in their local vdisk's persistent operations table. These secondary POT 22 entries are tagged with the same request UUID, and are used to ensure that sub-components of atomic operations are executed exactly once, even in the case of multiple server crashes and restarts.

Some secondary operations set locks on files, directories, or portions of directories. Locks in this system 10 are comprised of either a lock on an entire file handle, or a lock on a specific file name within a directory file handle. Locks on file handles conflict only if they specify the same file handle. Locks with names and file handles conflict only if both components match exactly. If one lock is a whole file handle lock and the other is a name lock, they conflict only if the file handle components match. Independent of the above, two read locks never conflict, even if the file handles would otherwise conflict.

Each class of directory modification operation in turn is now examined.

A vdisk delete or rmdir operation begins at the parent directory's vdisk 24 server. The request creates a primary POT 22 entry with a new UUID, and the target file handle (including the target vdisk 24) is determined by doing a lookup operation on the directory. Before doing the lookup operation, the request establishes a lock on the <parent-dir, name> mapping, and once the local lookup operation completes, the operation sends a perform-unlink-target request to the target vdisk 24 tagged with the POT 22 entry's UUID. The perform-unlink-target operation sets a write lock on the target file handle; a parameter to this operation tells the server whether the vdisk 24 server should wait for the lock or should instead fail the operation on a lock conflict, and for file delete, the caller sets the "wait" flag only if the target file handle follows the source directory lock in the global locking hierarchy. If, as is likely, there is no conflicting lock, the target object is locked, a secondary POT 22 entry is created with the request's UUID, the object is destroyed, the lock on the target object is released, and the perform-unlink-target operation is marked as complete. While the object has been destroyed, and the operation is marked as complete, the request, tagged by UUID, stays in the persistent operation table until the operation is also completed at the primary server, to ensure that retransmissions of the perform-unlink-target operation are detected, and not re-executed. Once the perform-unlink-target call has completed, the primary vdisk 24 removes the file name from the source directory, and drops all of its local locks. The primary removes the operation's POT 22 entry is removed from its POT 22, and a response is sent to the originator of the request. In addition, the request's UUID is batched up and sent eventually to the target object's vdisk 24 as part of a batch persistent-operation-complete request. Upon receipt of this message, the secondary removes the operation from its persistent-operation-table as well, since at this point, it knows that the operation will never be retransmitted (as it has been removed from the primary server). Note that if a crash occurs before the persistent-operation-complete request has been processed, the secondary can iterate over all of its pending operations, checking with the primary vdisk 24 to see if the operation is still in progress; if the secondary finds any operations that are no longer present in the primary's POT 22, the secondary can remove the operation from its table, as well.

Figure 6:
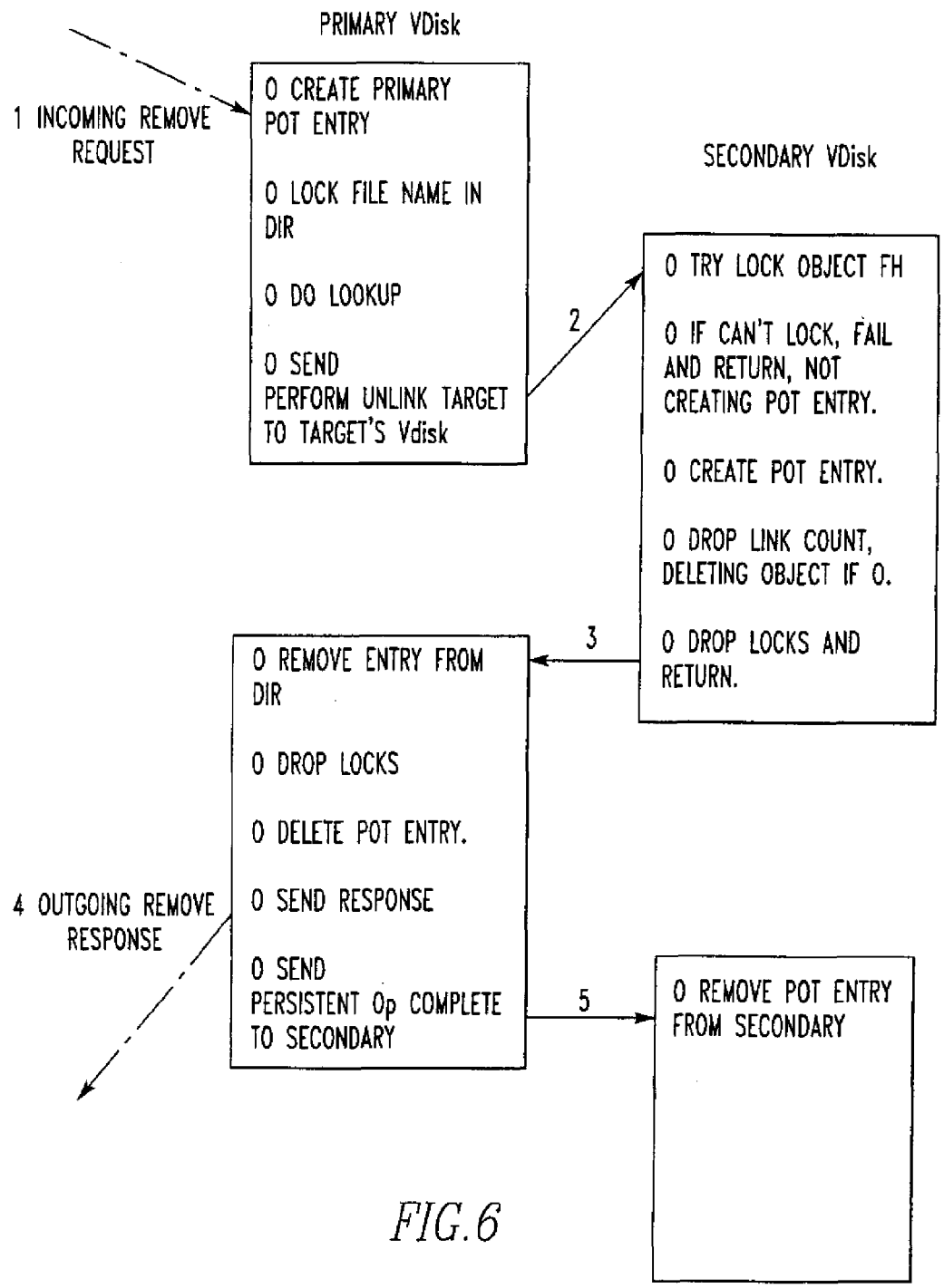
FIG. 6 shows the message traffic involved in a file or directory delete operation, in the simple case where locks are all obtained without conflict.

FIG. 6 shows the message flow for this example.

Figure 7:
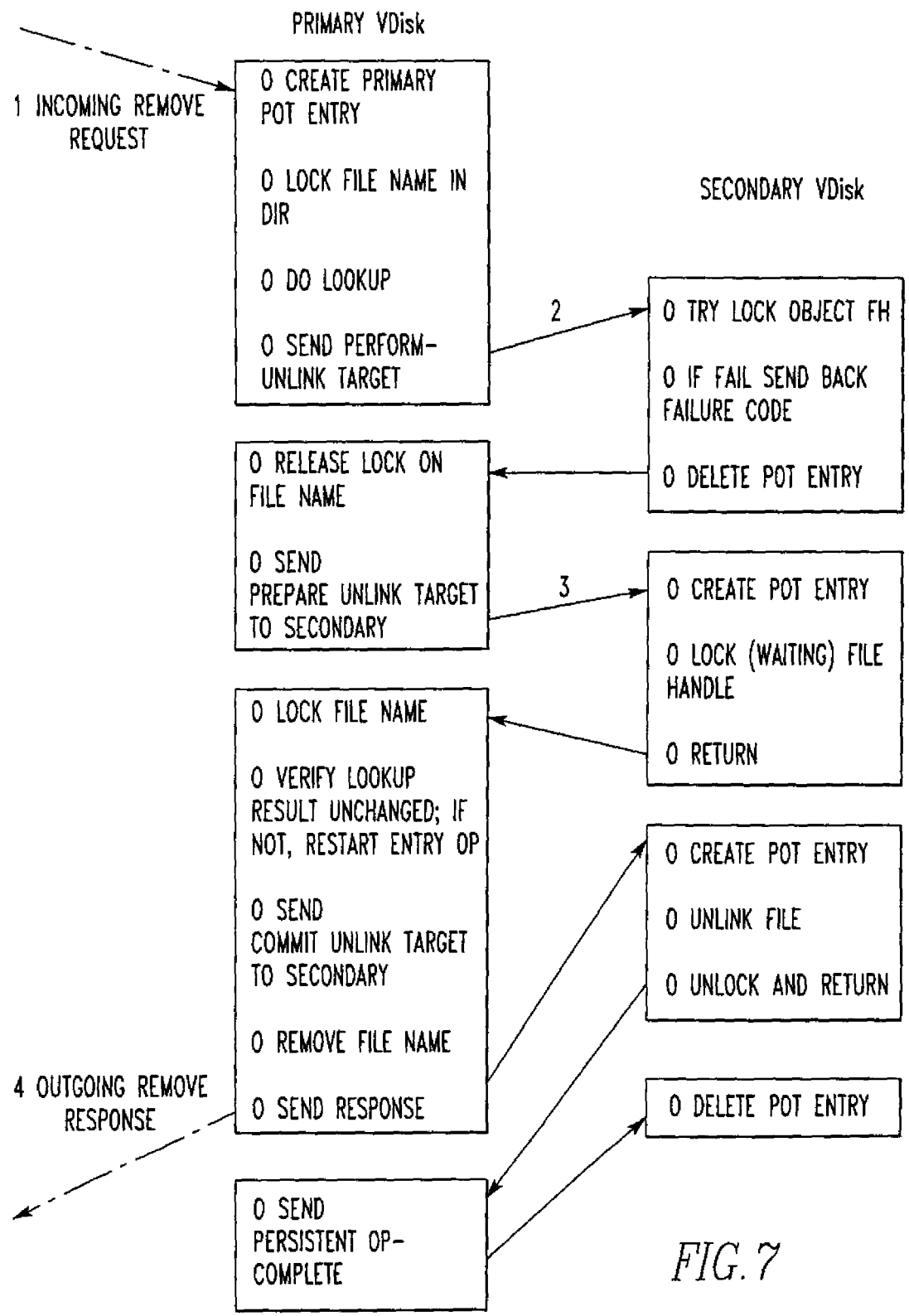
FIG. 7 shows the message traffic involved in a file or directory delete operation, in the case where optimistic locking fails and locks have to be obtained again in a different order.

FIG. 6 shows the behavior of the system 10 when the target succeeds at obtaining its lock, or if the target waits for its lock. It is also possible that the target failed to obtain its lock on the target file handle. In this case, the source vdisk 24 releases its locks, and tries the operation in two phases, first locking the target, and then doing the actual work. In this case, the primary vdisk 24 server sends a slightly different request, prepare-unlink-target to the target. The prepare-unlink-target specifies that upon a conflict, the request should wait for the lock. After the primary gets the response, the source locks the source handle, and verifies that the name still matches the locked object. If it doesn't, the entire operation is restarted; otherwise the source server marks the operation as committed, and removes the entry from the directory, while concurrently telling the prepared target vdisk 24 to remove the target object, by sending it a commit-unlink-target operation. Once the removal is complete, the source vdisk 24 completes the operation and removes the operation from the persistent operation table. FIG. 7 shows the behavior of the system 10 if the lock can't be obtained initially.

The hard link operation works fairly similarly to remove, but is simpler because all of the file handles are known at the start of the operation. The parameters to link include a source directory and file name, and a target file handle that may be part of another vdisk 24. The source vdisk 24 determines the locking order between the target file and the source directory. The operation begins, as usual, by creating a request with a new UUID on the source vdisk 24.

Figure 8:
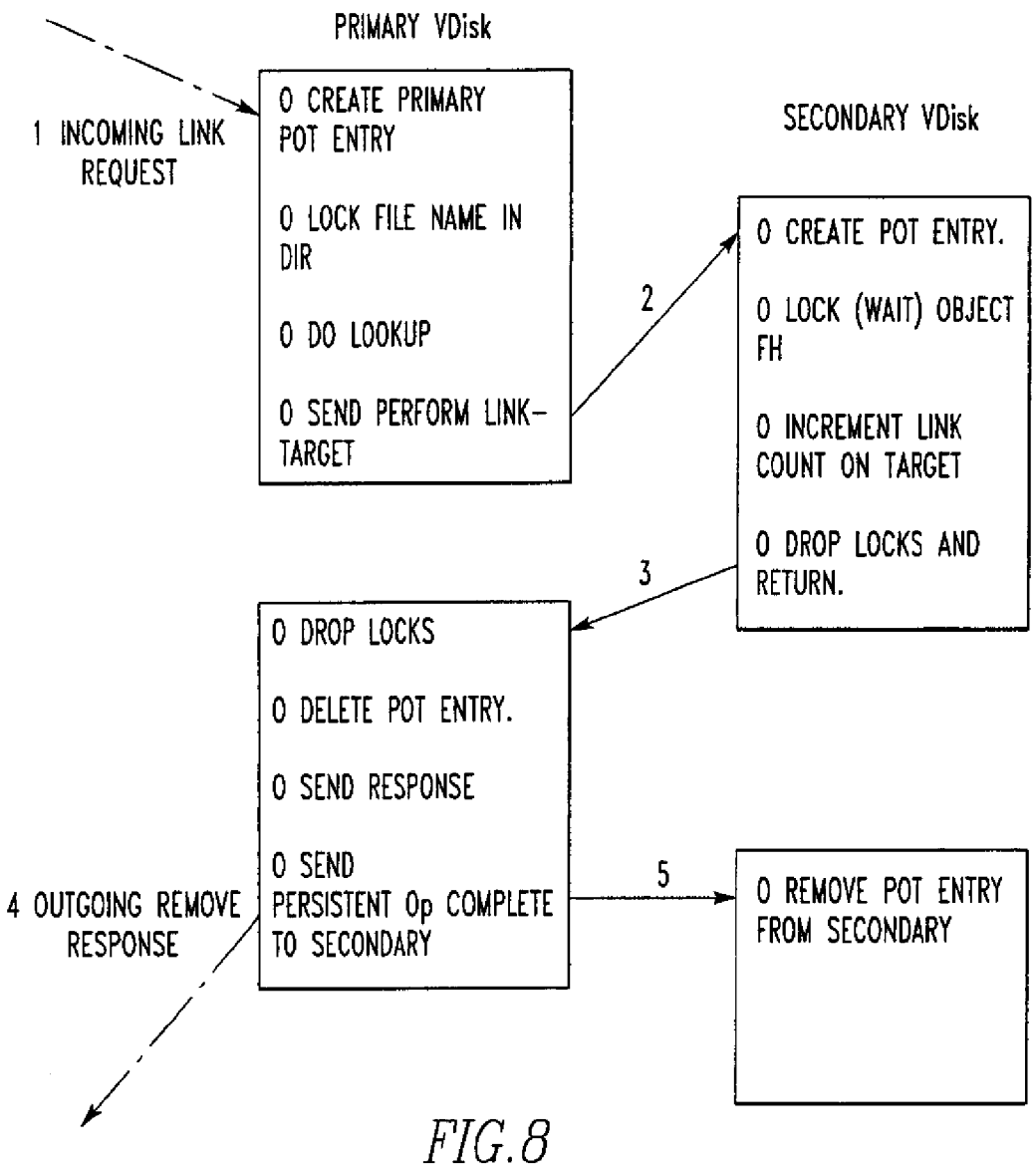
FIG. 8 shows the message traffic involved in a hard link operation (source locked first case).

If the source needs to be locked first, the source vdisk 24 locks the directory+name, and then sends a perform-link-target operation that does the locking for the link target, and updates the attributes as well (primarily the link count and ctime fields). Once the source receives the response, its local entry transitions to "complete" state and batches up a cleanup operation to the target vdisk 24, upon receipt of which the target can remove the operation from its persistent operation table and release all of its locks. FIG. 8 illustrates this message flow.

Figure 9:
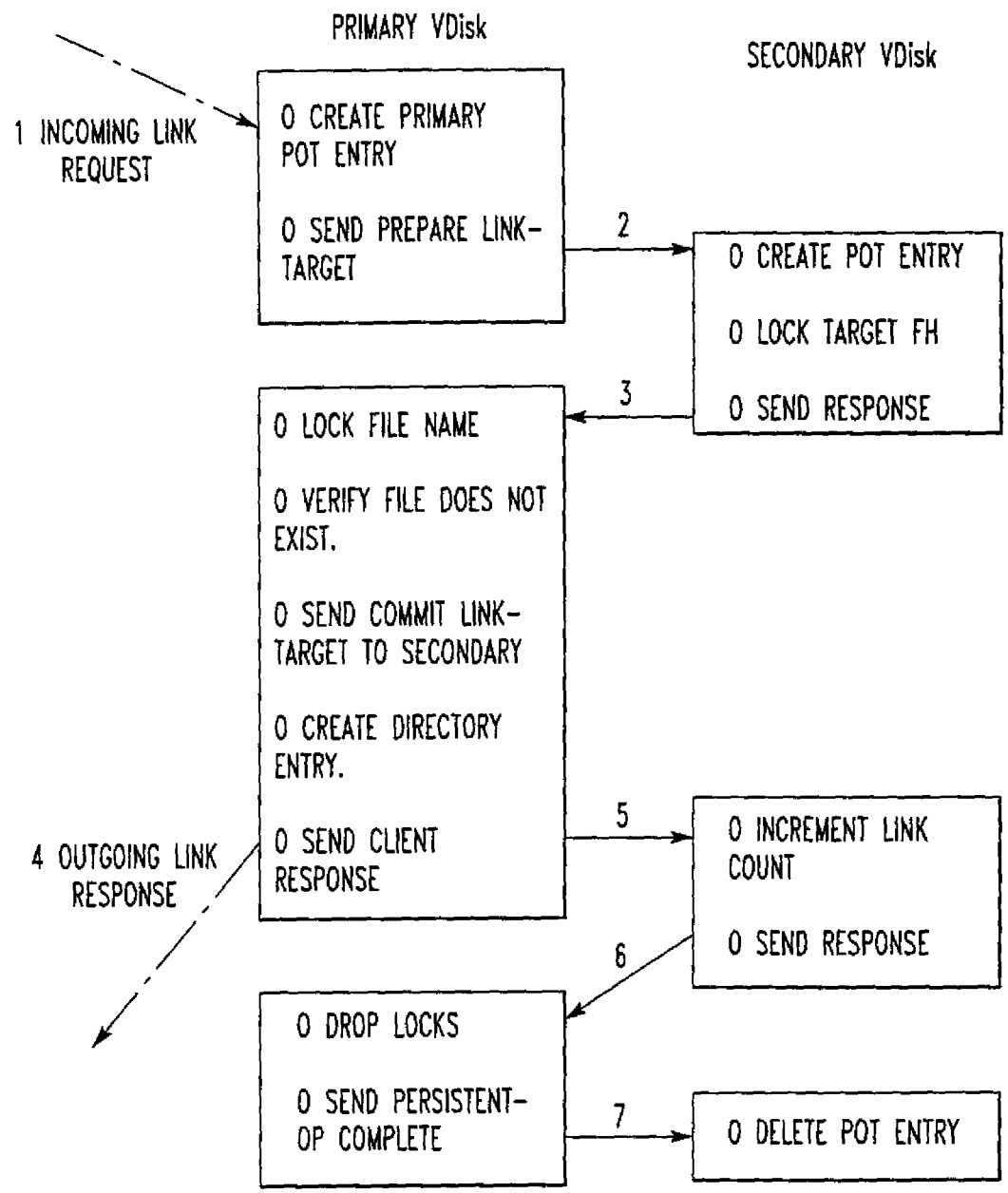
FIG. 9 shows the message traffic involved in a hard link operation (target locked first case).

If the target needs to be locked first, the source then sends it a prepare-link-target request, which locks the target file. The source then locks the source directory+name, ensures the entry doesn't exist, and creates it. Finally, it sends the target a commit-link-target request. The target executes the request, and keeps it in its POT 22 until the source contacts it, as part of a piggy-backed operation, indicating that the operation is complete and the request has been deleted. At this point, the target can remove the operation from its persistent operation table. FIG. 9 illustrates the message flow in this case.

Create and mkdir function similarly to each other. Because both operations create new entities, rather than dealing with existing entities that might be active, they are simpler than remove/rmdir to implement.

The operation begins at the directory's vdisk 24 (the primary vdisk 24), where the operation locks the file handle+name, and adds a new create request to the persistent operations table.

The target vdisk 24 is chosen either via a policy associated with the parent directory in which the object is being created, or via a global policy associated with the entire file system 10. No matter what the policy's source, the policy can select a vdisk 24 on which to create the new object based on the load on the vdisk 24, the operations/second capacity of the vdisk 24, the space available on the segments comprising the vdisk 24, or any other function of the state and configuration of the system's vdisks 24.

The target object's vdisk 24 (the secondary vdisk 24) then receives a perform-object-create operation, telling it the type of object to create (empty directory, symbolic link, or file). The object is created and the response is returned to the primary vdisk 24, along with the identity of the newly created object. The primary vdisk 24 then creates the directory entry with the new object name and file handle, and marks the operation as complete. The vdisk 24 then batches up the completion notification to the secondary vdisk 24, which removes the operation from its persistent operations table.

Figure 10:
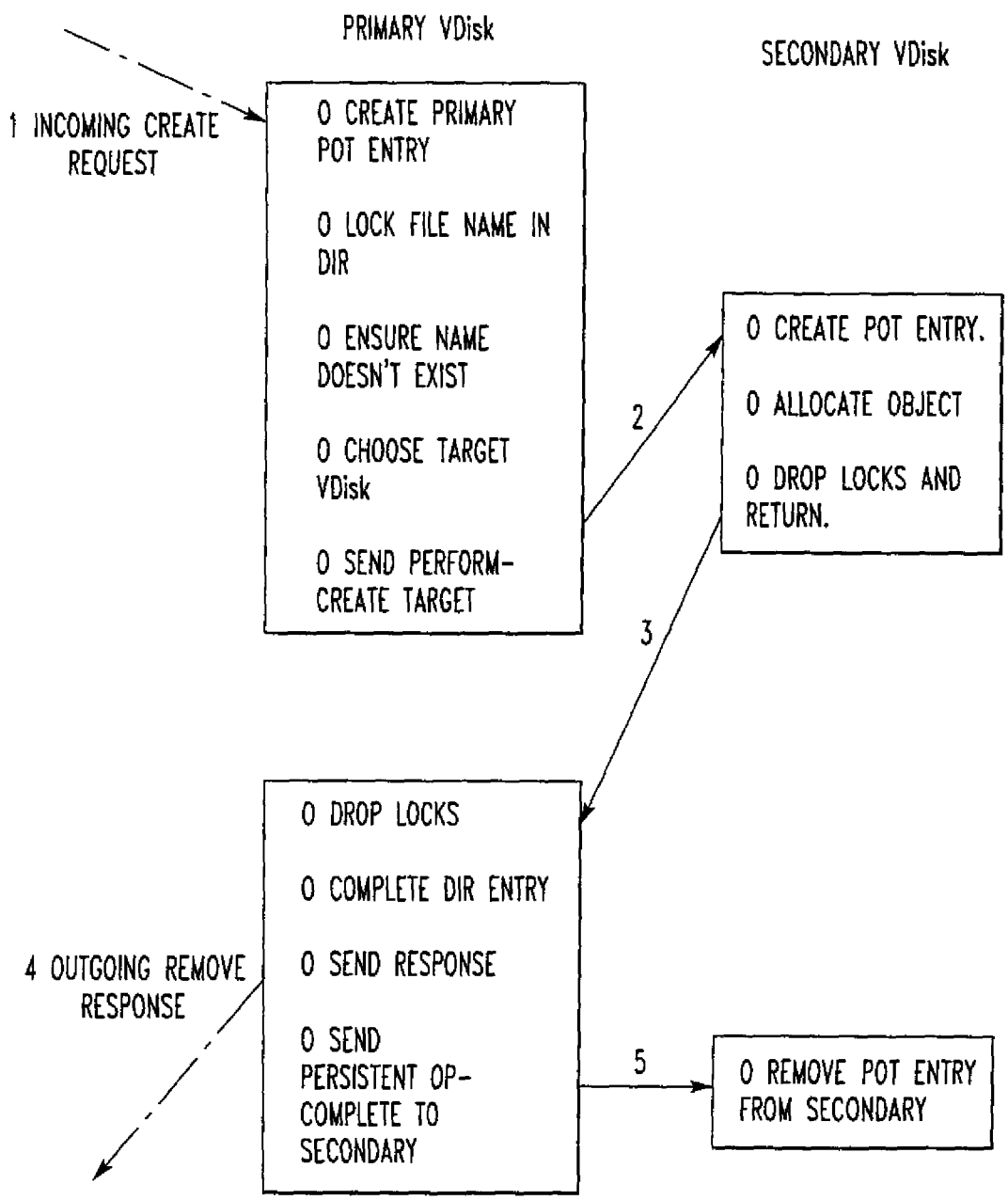
FIG. 10 shows the message traffic involved in a file create/directory create or symbolic link create operation.

FIG. 10 illustrates the message flow.

Since these operations actually create new objects, one of the most important functions they perform is choosing a vdisk 24 to hold the new file, directory, or symbolic link. There are many potential algorithms to follow here, and the specific algorithm can be chosen either as a policy associated with the parent directory, or by a more global policy, perhaps pertaining to the entire global file system 10.

One vdisk 24 choice function might be to create a new object on the vdisk 24 with the most free space, or the greatest percentage of free space; this would automatically keep space utilization balanced. Another vdisk 24 choice function might be to create a new object on the vdisk 24 with the lowest operation rate, i.e. on the vdisk 24 with the most spare capacity in operations/second. Obviously hybrid scoring approaches that combine a "free space" store and a "available operations/second" score could also be used. For example, the choice function could compute a linear combination of the two scores, and the invention could then create new objects on the vdisk 24 with the lowest hybrid score. Other hybrid functions might be include quadratic functions over the relevant scores, as well.

Of course, a very simple vdisk 24 choice function might be a simple round-robin algorithm, where vdisks 24 are chosen in a repeated, circular pattern, but it is unlikely that such an approach would be optimal under any useful metric.

The rename operation can involve up to four separate objects: a source directory, a target directory, a source file or directory, and a target file or directory. All four, in the worst case, may be located on separate vdisks 24. Semantically, the rename operation removes the directory entry in the source directory, and creates a new directory entry to the same object in the target directory. If an entry already exists at the target directory, it is first destroyed.

The operation begins at the source directory's vdisk 24. If the source and target directories are identical, a simplified operation can be performed. The source (and thus target) directory is simply locked and the contents of the directory are updated directly. There are two cases, depending upon whether the target of the rename exists or not. If the target does not exist, then nothing changes except the directory storing the file/directory names. In this case, there is no message flow to illustrate, because all work is done by the source/target directory's vdisk 24 server.

If the target file or directory does exist, there is a somewhat more complex operation, similar to a file delete. Specifically, a rename where the source and target directories are the same, and where the target of the rename exists (and will be unlinked), works similarly to a file delete operation, except that the locking is a bit more complex, since there are two names to lock in the parent directory, as well as the target object's file handle. A locking hierarchy is chosen that orders locks by file handle first, and then by file name within the file handle (for locks that include a file name component). With this locking order, either both file names are locked in the directory before locking the target file, or both file names are locked in the directory after locking the target file. A rename in this case begins by creating a POT 22 entry for the rename operation, and locking both the source and target file names within that directory. It then sends a perform-unlink-target operation to the target file's vdisk 24 (the secondary vdisk 24), setting the flag saying that the target should wait for the lock only if the target's file handle is ordered after the directory's file handle in the locking order. If the target succeeds at setting the lock, it creates a POT 22 entry for the rename operation, and unlinks the target. It then responds to the primary vdisk 24, which completes the rename operation by removing the source directory entry and changing the target directory entry to point to the source file's file handle. The message flow is the same as for the simple file delete case illustrated in FIG. 6. If the attempt at locking the target fails, the rename operation then drops all of its locks, and sends a prepare-unlink-target to the secondary vdisk 24, and, upon receiving a response, then locks the parent directory's source and target file names. At this point, it verifies that the target file's identity is unchanged; if it has changed, the entire operation restarts. Otherwise, the primary vdisk 24 sends a commit-unlink-target operation to the secondary vdisk 24, while updating the directory as in the first case. Finally, the primary vdisk 24 sends a response back to the caller, and batches a persistent-op-complete operation to clean up the state on the secondary vdisk 24. FIG. 7 shows the message flow for this case, with the difference that the directory update is as is described above in this paragraph.

In the most complex rename case, when the source and target directories differ, the operation is significantly more complex and expensive. The source directory's vdisk 24 server begins by creating a request that starts by sending a lookup operation to the target directory's vdisk 24, looking up the target handle, while simultaneously locally looking up the source file handle. Once these operations complete, the identity of all objects involved in the rename operation is known, but no locks are held.

The source vdisk 24 server then sends a prepare-rename-source message to the source object's vdisk 24, locking that object; it sends a prepare-rename-target message to the target object's vdisk 24; and it sends a prepare-rename-tdir message to the target directory's vdisk 24. Each of these operations locks the entity in question, with the source directory's vdisk 24 locking the source directory, and sending these messages sequentially in the order required by the global locking hierarchy. Once all of the entities are locked, the source vdisk verifies that the results of the initial lookups remain unchanged; if not, the entire operation restarts. Note that the prepare_rename_tdir operation performs the target lookup verification step itself, to avoid requiring an additional message exchange. Once all entities are prepared, locked and verified, the source then sends commit-source-object, commit-target-object and commit-target-directory operations to each of the source-object vdisk 24, the target-object vdisk 24, and the target-directory vdisks 24, respectively. Once those operations have completed, the request enters the completed state at the source directory vdisk 24, and batches up completion notifications to all of the other vdisks 24, so they can free their state knowing that the source directory vdisk 24 will never again send operations associated with the completed request.

Figure 11:
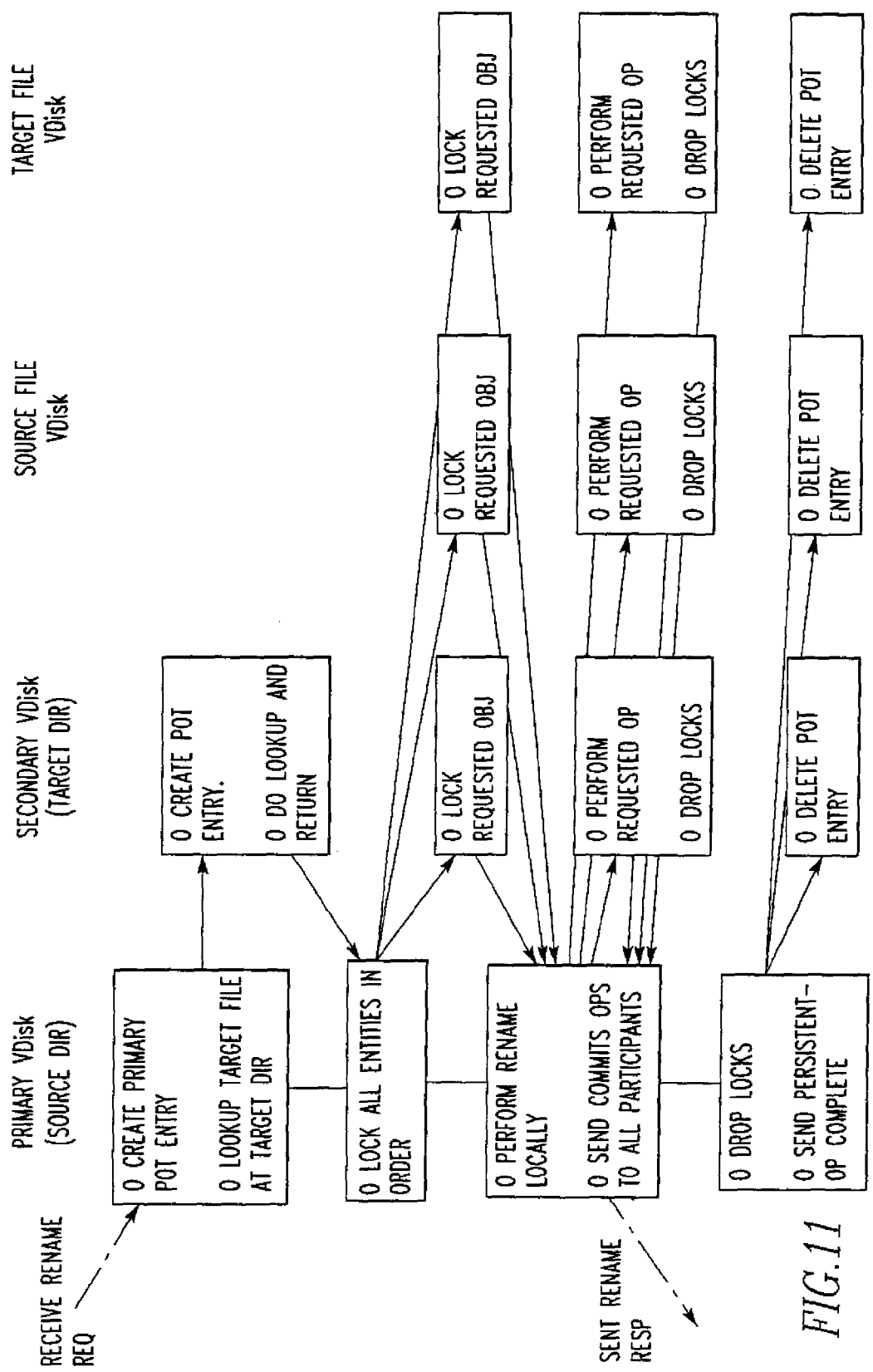
FIG. 11 shows the message traffic involved in a rename operation.

FIG. 11 shows the message flow in the most general version of the rename vdisk 24 operation.

The persistent operations table is utilized in the functioning of the above operations. Here is an example POT 22:

| UUID | OpCode | Primary Dir FH | Secondary FH/Name | Rename2 Dir FH | Rename2 FH/Name | Status |
|---|---|---|---|---|---|---|
| 1 | Create | VDisk = 1 Inode = 100 | VDisk = 2 Inode = 121 Name = "foo" | NA | NA | Complete |
| 2 | Delete | VDisk = 1 Inode = 102 | VDisk = 3 Inode = 122 Name = "bar" | NA | NA | Remote Done |
| 5 | Rename | VDisk = 1 Inode = 110 | VDisk = 30 Inode = 130 Name = "m" | VDisk = 3 Inode = 211 | VDisk = 11 Inode = 212 Name = "p" | Remote Sent |
| 4 | Perform Unlink Target | VDisk = 30 Inode = NA | VDisk = 1 Inode = 132 Name = NA | NA | NA | Response Sent |

In the table above, a set of POT 22 entries for vdisk 1 is shown. For the first four entries, vdisk 1 is the primary vdisk 24, driving the distributed file system 10 operation in question. In the last entry, vdisk 1 is the secondary vdisk 24 for a delete operation being driven from vdisk 30.

In more detail, the first POT 22 entry describes a file create operation for a file name "foo" being created in the directory whose file handle is 1.100 (in the format <vdisk.inode>). The file is being created in vdisk 2, selected by policy rule associated with vdisk 1. The operation has run to completion, and when the response from the secondary vdisk was received, it included the actual allocated inode from vdisk 2, specifically inode 121, which was entered into this POT 22 entry as well. The operation is in "complete" state, meaning the operation completed at the secondary vdisk, and the primary vdisk has completed its work as well. The entry remains in the POT 22 only until the entry for this same UUID in vdisk 2's POT 22 entry can be removed.

The second entry describes a file delete operation, where the directory holding the file being deleted has file handle 1.102. The file being deleted has file handle 3.122, which was obtained by looking up the file name "bar" in the primary directory; from its file handle we see that it is stored in vdisk 3. The POT 22 entry is in "remote done" state, indicating that the secondary vdisk has freed the file, but the primary vdisk 24 has yet completed the removal of the directory entry from the primary directory itself.

The third entry (UUID 5) describes a rename operation, where the source and target directories have file handles 1.110 and 3.211, respectively. The file being renamed has file handle 30.130, which was determined by the primary vdisk 24 doing a lookup operation on "m", the file's name. The new name for the file is "p", and that file already exists on vdisk 11, with file handle 11.212. The operation is in "remote sent" state, meaning that primary vdisk is waiting for responses from the secondary vdisks 24 before it can continue. Note that there are three remote vdisks 24, 3 (holding the second, target directory), 30 (holding the file being renamed) and 11 (holding the file being deleted by virtue of being the target of the rename operation).

Finally, the fourth entry describes a delete operation where the directory holding the file being deleted is stored on primary vdisk 30, which is driving the delete operation for a file that happens to be stored on vdisk 1 (the secondary vdisk for this operation); the primary vdisk is requesting that this vdisk destroy that file, based on its file handle. The vdisk of the parent directory is 30, and the secondary vdisk does not need to know the inode component of that file handle. The file being deleted has file handle 1.132, and once that file has been destroyed, a response is sent back to the primary, telling it that the operation requested by transaction ID 4 is complete. Note that the entry is in "response sent" mode, meaning that the operation is complete at the secondary, and a response has been sent to the primary vdisk module.

The primary use of the persistent operations table (POT 22) is in failure recovery, where a processor 26 handling one of the vdisks 24 involved in a multi-vdisk directory update fails. Essentially, a POT 22 entry acts as an intentions log entry, describing the operation to be performed, and whether that operation completed successfully or not.

In all of the directory modifying operations described above in this section, there is a primary vdisk, which is the vdisk 24 at which the operation begins execution. For any given operation, the POT 22 entries created by the primary vdisk 24 are called primary POT 22 entries. Similarly, the vdisks 24 contacted by the primary vdisk 24 to perform part of a directory operation are called secondary vdisks 24, and their POT 22 entries are called secondary POT 22 entries. Note that these labels apply to the role a vdisk 24 and its POT 22 entries play in a particular operation; thus, a vdisk 24 may be the primary vdisk 24 for a particular operation even while it is a secondary vdisk 24 for another concurrently executing operation. For a given operation, the primary POT 22 entry and its secondary POT 22 entries are implicitly linked together by sharing the same unique transaction ID. In the example above, the first three entries are primary POT 22 entries, and the last entry is a secondary POT 22 entry.

Each POT 22 entry may be in one of two major states. It may be in the "executing" state, meaning that the request is currently executing, or it may be in the "complete" state, meaning that the request is finished, and has stored its results in the POT 22 entry.

If the processor 26 that created the primary POT 22 fails, then upon restart, the processor 26 restarts the request, skipping the stages it has already executed, but resending any subsidiary requests to the secondary vdisks 24. All of these retransmitted requests are resent with the original transaction ID, so that they can be matched with any already existing POT 22 entries, should the secondary vdisk 24 already have received the request before the primary's failure. If a secondary POT 22 entry indicates that the request is still in "executing" state, the secondary simply continues its execution. If there is no secondary POT 22 entry, indicating that the request has not yet executed, the new request begins execution. Finally, if the POT 22 entry is in "complete" state, the results of the operation, stored in the POT 22 entry, are sent back to the primary vdisk 24, without re-executing the secondary request.

Similarly, if a processor 26 processing a secondary POT 22 entry fails, then after recovering, if the secondary POT 22 entry is not in "complete" state, the operation is re-executed, skipping any portions that were already executed, and sending the response back to the primary vdisk 24 when the request completes. If the request is in "complete" state, the response is re-sent to the primary vdisk 24 without re-executing the request. If the primary vdisk 24 does not recognize the request's transaction ID, this means that the primary vdisk 24 had already received an earlier response from the secondary vdisk 24, completed the primary request, and cleaned up its POT 22 entry. In this case, the secondary vdisk can delete its POT 22 entry.

A basic disk block allocation policy is implemented by storing some descriptive tags with every segment in the system 10. These tags are implemented as a bitmap of administrator-defined attributes. For example, an administrator might define a "low latency" attribute, a "write efficient RAID" attribute and an "archival" attribute for storage, and apply the "low latency" attribute to segments comprised of flash storage, the "write efficient RAID" attribute to segments stored in RAID 1 storage, and the "archival" attribute to segments stored in RAID 5 storage. Other, orthogonal properties could also be defined, such as "rotating media" for drive-based segments, or "slow" media for data rotating below 5400 RPM.

In this basic policy implementation, each Mode has policy descriptors for three separate classes of storage used by the Mode. One policy descriptor describes the meta data associated with this file: in particular, the indirect blocks used for locating the file's data blocks. A second policy descriptor applies to the first N blocks of the file, and the final policy descriptor describes the storage holding the remainder of the file. Each policy descriptor may be represented as a pair of bitmaps, a mask bitmap and a value bitmap. A segment matches one of these pairs if the segment's tag bitmap, ANDed with the policy descriptor's mask bitmap, matches the descriptor's value bitmap. The fields stored in each Mode to represent these policies are shows in FIG. 12. In this structure, the field "Initial part block count" gives the value of N above, while each of the remaining boxes hold the mask and value bitmaps describing the segments to be used for indirect block allocation, initial part data allocation, and the segment to be used for the rest of the file's data allocation. Thus, for example, when a data block for an offset less than N needs to be allocated by a cleaner, one of the vdisk's segments is chosen from the set of segments whose descriptive tag matches the Mode's second policy descriptor.

Figure 12:
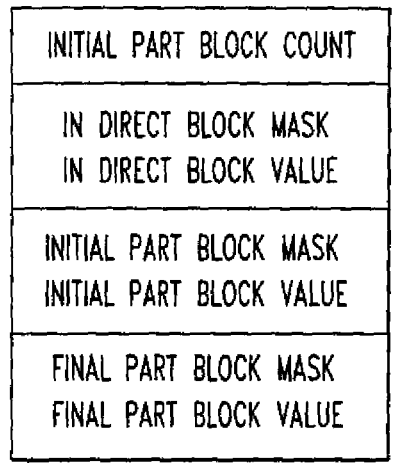
FIG. 12 shows the fields stored in an Mode for use by the simple policy mechanism.

When a new file or directory is created, the policy descriptor shown in FIG. 12 is inherited from the object's parent directory, and used to select storage for the data written to the newly created object.

There are a number of operations used for managing policies and the files using policies.

GetPolicy—returns the policy object associated with a file or directory.

SetPolicy—sets the policy object associated with a file or directory.

Recursive apply—sets the policy object for a directory, and all of its descendent directories and files.

Note that this is an exemplary policy description, and that many others are possible, including policy descriptors that are only applied if a file's attributes (size, owner, etc) have certain values, or the file's name matches a regular expression. One might, for example, define a policy that says all files whose name match the regular expression ".*\.o" and whose size is greater than 1 MB should be stored on "archival" class storage.

When the policy description in an Mode is updated, the current data layout for the corresponding file may no longer match the updated policy. In this case, the Mode is placed in a persistent queue for a background process to update the Mode data's allocation to match the new policy. Similarly, when new storage is placed into service for a vdisk 24, the existing policy descriptors may, upon re-examination, select some of the new storage to hold meta-data or normal data. In this case, all of the Modes need to be placed in a queue for a background task to verify that the inodes' block allocations still match the allocation policies.

For example, the administrator might add some new, very low latency storage to a vdisk's segment list, and then specify a new policy for one or more Modes to place the first 64 KB of data in that new segment. The system 10 would do this by performing an "AddSegment" operation to add the storage to the vdisk 24, adjusting the table describing which segments are part of the storage space for a vdisk 24 to include the new segment, possibly followed by a SetPolicy operation to specify where to use this new storage for a portion of the file system name space. The system 10 would then internally perform a "readjust" operation on the Mode or Modes in question, as the policies are updated, which would check that each block in each file whose policy is updated is allocated from a segment with the appropriate class of service. If a file fails this test, then the readjust operation would, for every block allocated from the wrong segment, allocate a block in the desired segment, copy the data from the old segment to the new segment, and adjust the indirect block pointing to the original block to point to the new block's location.

The preceding described the operation of the system 10 in terms of operations on individual Modes. These Modes are implemented in a manner similar to that in which Unix systems like FreeBSD implement Modes in their UFS file system, with the exception that in this invention, a policy-based block allocator is invoked to choose the segments from which to obtain blocks to add to a file. This allocator is invoked any time that any of the operations discussed in this section need to allocate more disk blocks to an existing or new file, directory, or symbolic link.

It is assumed that when a file or directory is created, it inherits a reference to a policy object from its parent directory. This policy specifies in some manner which blocks within the file should be allocated with which CoS from among the segments making up the file's vdisk 24. For example, one such policy might be the disk block allocator described above.

When disk blocks are later allocated to such a file, the file's policy is consulted, and this policy specifies the desired class of service for the newly allocated blocks. The block allocator then chooses a segment with the desired CoS from among those within the file's vdisk 24, and allocates space from that segment's block number subspace. Note that since all of the segments in a vdisk 24 reside at different locations within the same block number space, once blocks have been chosen to hold a file's newly added data blocks, the rest of the file allocation process proceeds in the same way as allocating space to files in the FreeBSD system.

The blocks within a segment are located via a very simple per-segment table that identifies the block number space for each segment within each vdisk 24. For example, the segment table shown below might specify that the dotted segment resides at vdisk 24 block offset 10000 for 5000 blocks, and that the white segment resides at vdisk 24 block offset 20000 for 3000 blocks. Once a segment has been chosen for block allocation, the file system 10 determines the corresponding block number range for the segment, and then consults the UFS-like block allocation bitmap to determine which blocks are actually available in that segment. These block numbers are then stored in the UFS-like Modes and indirect blocks, just like the file system 10 stores any block number generated through any other block allocation algorithm used by the file system 10. A global (per vdisk 24) policy describes the class of service desired for the allocation of global file system meta data, such as Modes; typically, these would be allocated from relatively low latency storage.

The internals of a system 10 designed to implement a file system 10 comprised of multiple vdisks 24 is based upon implementing a set of vnode interface 18 calls on top of the vdisk 24 layer. Most vdisk 24 operations have analogous vnode operations, so that the interface 18 function for those operations is very simple.

FIG. 13 shows the relationship between vnodes, vdisks 24, and segments, in the context of a Unix operating system such as OpenSolaris running a file system 10 based on this invention. In FIG. 13, there is a VFS instance for each exported file system tree, and each such instance is composed of one or more vdisks 24.

In FIG. 13, it is shown how the vdisk 24 manager can fit into a standard Unix kernel. The figure shows three file systems 10 (and thus three name spaces). The first, VFS A, is comprised of files from vdisk 1 and vdisk 2. The second, VFS B, is comprised of files allocated from vdisk 3. The third, "Local UFS VFS" is a file system implemented from a normal Unix file system on its own local disks 20.

The VFS shim layer implements a very thin layer mapping vnode operations to vdisk operations, and is described below in detail.

Once a vdisk 24 operation is invoked, some vdisk 24 operations, especially the directory modification operations described above, require performing internal vdisk 24 operations at other vdisks 24 implementing the same VFS. For example, a file create performed on a directory within VFS A that happens to be located on vdisk 1 might create its file on vdisk 2, and thus might invoke the perform-create-target function on vdisk 2. The block labeled "VDisk <n> Secondary" represents the server for those internal vdisk operations, and the dashed arrows indicate that these internal vdisk operations are typically invoked by the primary vdisk implementation for some other vdisk within the same file system tree (and thus the same VFS).

Each vdisk 24 implements its own pool of Modes, and so needs to store data persistently. Each vdisk 24 has a set of segments, accessed via the interface 18 described below, that it uses to store its persistent data. Different segments provide differing classes of service. For example, vdisk 1 has reasonably fast disk storage in a RAID 1 segment, and some extremely fast but expensive storage in a flash memory 12 segment. The vdisk 24 may have, for example, an automatic allocation policy specifying that the first 256 KB of each file should be allocated from blocks in the flash segment, and any additional storage should be allocated from the slower disk segment. If this policy is followed, for example, sequential access to a randomly chosen set of files would be very fast, since the first 256 KB of data would be available nearly instantaneously, during which time the disk arms are positioned to transfer the remainder of the file.

Similarly, vdisks 2 and 3 are compromised of a mix of relatively inexpensive RAID 5 storage, along with more expensive, but better performing RAID 1 storage.

The vdisk interface 18 consists of two sets of functions, a primary interface 18 called from the vnode layer on incoming file system calls, and a secondary interface 18 invoked by directory modifying primary vdisk operations that span multiple vdisks 24.

The calls in the vdisk 24 primary interface 18 are typically called from the vnode layer. Many of the calls are applied to, or take, VDiskInode parameters describing the files themselves. The following describes the operations in the vdisk primary interface used by the vnode layer; some common operating system specific parameters, such as authentication credentials, have been omitted for clarity:

VDiskInode::release( )—decrease the reference count on an Mode.

VDiskIndode::hold( )—increment the reference count on an Mode.

VDiskInode::getattr(VDiskInodeAttr *attrsp)—get attributes associated with an inode.

VDiskInode::setattr(VDiskInodeSetAttr *newAttrsp, VDiskInodeAttr *updatedAttrsp)—update attributes as described by newAttrsp, returning the updated attributed in *updatedAttrsp.

VDiskInode::blockRead(uint64_t offset, uint32_t count, uint32_t flags, uint32_t *bufCount, buf **bufpp, VDiskInodeAttr *attrsp)—read data from Mode starting at offset, for count bytes. The value *bufCount on input specifies the size of the bufpp array, and on output is set to the actual number of referenced buffers returned. The Mode's attributes at the time of the read are returned in *attrsp. Note that a flag of 1 specifies that buffers should be obtained held for writing instead of reading, indicating that the operation is part of a write operation that will modify the buffers.

VDiskInode::truncate(uint64_t offset, uint32_t count, VDiskInodeSetAttr *newAttrsp)—zero bytes from byte 'offset' for 'count' bytes. Any whole blocks that can be freed are freed. The newAttrsp parameter optionally may specify updated mtime, ctime or atime values for the file.

VDiskInode::readdir(uint64_t *cookiep, uint32_t *countp, char *resultsp, uint32_t *flagsp)—returns directory listing results, starting at an opaque value. In the initial call to readdir, *cookiep should be 0. *countp gives the number of bytes available in the *resultsp buffer. Each entry consists of a 16 bit file name length, followed by a UTF-8 encoded file name, followed by a 64 bit "inode number", followed by a 64 bit cookie value for the directory entry following this entry. An integral number of directory entries is always returned by readdir. The 1 bit is set in *flagsp if EOF is encountered, and no further entries will be returned. Note that *countp is updated to indicate the actual number of bytes returned, and *cookiep is updated to give the cookie value that, when passed into a new instance of this call, will return the next entry in the directory listing after those returned by this call.

VDiskInode::lookup(char *namep, VDiskInode **newInodepp)—lookup the name 'namep' in the specified directory, returning a held reference to the target inode in *newInodepp. If the entry can't be located, a non-zero error code is returned. A return code of ENOENT is reserved for an indication that no temporary error occurred, and the file name definitely does not exist in the directory.

VDiskInode::readdirplus(uint64_t *cookiep, uint32_t *countp, uint32_t *entriesp, char *resultsp, VDiskInodeAttr *attrsp, uint32_t *flagsp)—This function acts like a combination of a readdir operation followed by getattr operations for each file entry returned. The parameters are the same as in readdir, with the following changes. The field *entriesp on entry gives the space available to hold returned attributes in the attrsp array, which points to an array of attribute structures. On exit, this field is set to the number of entries actually returned. The information returned in attrsp is ordered the same as the entries in the resultsp array.

VDiskInode::create(char *namep, VDisk *newVDiskp, VDiskInodeSetAttr *newAttrsp, VDiskInode **inodepp, VDiskInodeAttr *attrsp)—create a new file in the specified directory, using the new attributes specified by newAttrsp. The resulting attributes are returned in *attrsp, and a new Mode is returned in *inodepp. Note that the file is created in a new vdisk specified by the newVDiskp parameter; if this parameter is null, the target vdisk is determined by consulting the policy choice module shown in FIG. 5.

VDiskInode:: emove(char *namep, VDiskInode **inodepp, VDiskInodeAttr *attrsp)—remove a file or symbolic link from the specified directory. The updated object attributes are returned in *attrsp; this is meaningful for file's whose link count was decremented, but not to zero; in this case, *inodepp will also be set to a held reference to the Mode in question.

VDiskInode::mkdir(char *namep, VDisk *newVDiskp, VDiskInodeSetAttr *newAttrsp, VDiskInode **inodepp, VDiskInodeAttr *attrsp)—create a directory with the specified name, with the new attributes specified by *newAttrsp. A held reference to the newly created Mode is returned in *inodepp, and the newly created file's attributes are returned in *attrsp. Note that the file is created in a new vdisk specified by the newVDiskp parameter; if this parameter is null, the target vdisk is determined by consulting the policy choice module shown in FIG. 5

VDiskInode::rmdir(char *namep)—remove the directory named 'namep' from the directory to which this operation is applied.

VDiskInode::symlink(char *namep, VDisk *newVDiskp, char *contentsp, VDiskInodeSetAttr *newAttrsp, VDiskInodeAttr *attrsp)—create a symbolic link named 'namep' with initial contents 'contentsp'. The initial attributes are set from *newAttrsp, and the resulting full attributes are returned in *attrsp. Note that the file is created in a new vdisk specified by the newVDiskp parameter; if this parameter is null, the target vdisk is determined by consulting the policy choice module shown in FIG. 5.

VDiskInode::link(char *namep, VDiskInode *inodep, VDiskInodeAttr *attrsp)—create a hard link with name 'namep' in the specified directory, to the object specified by the Mode *inodep. Updated attributes for the target object are returned in *attrsp, as of immediately after the operation's completion.

VDiskInode::rename(char *snamep, VDiskInode *targetp, char *tnamep, VDiskInode sinodep, VDiskInode tinodep, VDiskInodeAttr *sattrp, VDiskInodeAttr *tattrp)—rename the file name 'snamep' in the source (applied) inode, changing its name to 'tnamep' in the target directory 'targetp'. A read reference to the updated source inode is returned in **sinodep, and a reference to the target inode is returned in *tinodepp if the target object continues to exist after the unlink operation. Attributes immediately after the operation are returned in *sattrp and *tattrp for the source and target objects, respectively.

The operations above refer to the following non-opaque structures: bufs (disk buffers), VDiskInodeAttr and VDiskInodeSetAttr structures. The following tables show the contents of each of these structures:

The buf structure represents a disk buffer. While there are many possible implementations of such a structure, the key fields that are typically present include the virtual and physical addresses of the data in the buffer, as well as a reference count, that, when zero, indicates that no processes are actively accessing the buffer.

| buf structure | | |
|---|---|---|
| Data | char * | Points to mapped in data buffer. |
| PhysAddr | char * | Points to phyocation of buffer. |
| RefCount | uint32_t | Reference count for buffer. |

Next, the VDiskInodeAttr structure is described; this gives information similar to the Unix "struct stat" structure:

| VDiskInodeAttr structure | | |
|---|---|---|
| Device | uint64_t | A unique value indicating the vdisk storing the file. |
| Inode | uint64_t | A unique value indicating the inode with the vdisk/device corresponding to this file. |
| UnixModeBits | uint16_t | 16 bits of file mode as defined by POSIX file system specification (1003.1). This includes both the file type as well as the basic file protection bits. |
| Owner | uint32_t | File owner's ID. |
| Group | uint32_t | File's group owner. |
| Length | uint64_t | File length in bytes. |
| Access time | 2 x uint32_t | Time file data last accessed, in seconds and microseconds since midnight, Jan. 1, 1970 GMT. |
| Modification time | 2 x uint32_t | Time file data last modified, in same format. |
| Change time | 2 x uint32_t | Time file attributes last changed, in same format. |
| Space | uint64_t | Space allocated for file, in bytes. |

The VDiskInodeSetAttr structure includes all of the fields of a VDiskInodeAttr structure, plus a single bit for each field, which is set to 1 if the value is valid in the structure, and should be set into the file's attributes, and 0 if the value should be ignored. This structure is passed to calls that set or change file attributes, and only the fields for which the corresponding bit is set are updated by the call.

Note that in all cases except for persistentOpComplete, the POT 22 entry remains in the persistent operations table until a persistentOpComplete is received for the entry. At any time, the secondary may also verify that the operation tagged with a POT 22 entry's request ID is still present at the primary; if it isn't, this means that the operation completed, the persistentOpComplete request got lost, and the secondary can and should remove the operation's entry from the POT 22 as well.

VDisk::performUnlinkTarget(UUID requestId, VDiskInode *targetp)—Create POT 22 entry with ID requested, then lock the file handle for Mode targetp, decrement the target object's link count, and drop the file handle lock, leaving the POT 22 entry to catch duplicate operations.

VDisk::prepareUnlinkTarget(UUID requestId, VDiskInode *targetp)—Create POT 22 entry with ID requested, and lock the file handle for inode targetp, leaving locks set and POT 22 entry to catch duplicate operations.

VDisk::commitUnlinkTarget(UUID requestId)—Unlink the locked object referenced from the exiting POT 22 entry, drop the lock and return. This call expects to be applied to a requestId specifying an operation that has already performed a prepareUnlinkTarget operation, which specified the inode to be unlinked.

VDisk::performLinkTarget(UUID requestId, VDiskInode *targetp)—Create a POT 22 entry with the specified requestId, lock the specified object, increment object's link count, drop locks and return. The entry remains in the POT 22 until the receipt of a persistentOpComplete request with the same transaction UUID.

VDisk::prepareLinkTarget(UUID requestId, VDiskInode *targetp)—Create a POT 22 entry with ID from requestId, lock the specified object *targetp and return.

VDisk::commitLinkTarget(UUID requestId)—Increment the link count on the object locked by the request and stored in the POT 22 entry, update its attributes, drop the lock on the target and return. This call expected to be performed on a POT 22 entry for which a prepareLinkTarget operation has already been successfully performed.

VDisk::performCreateTarget(UUID requestId, VDiskInode **targetpp, VDiskInodeSetAttrs setAttrs)—Create a POT 22 entry for the request ID, allocate the target file Mode (storing it in the POT 22 entry) and return the new object's file handle to the caller. On a retransmission of this request, resend the already allocated object's file handle. The setAttrs parameter specifies the type of object to be created, as well as its initial attributes.

VDiskInode::lookup—This is the same function as present in the primary interface 18; it can also be invoked via the secondary interface 18.

VDisk::prepareRenameOperand(UUID requestId, VDiskInode *targetp)—Create POT 22 entry, lock file handle of target Mode, and return. This operation is performed for the target directory Mode, the source object Mode and the target object inode for rename operations affecting two directories. For single directory renames, the operation is performed on the source object Mode, and, if it exists, the target object Mode.

VDisk::commitRenameTargetDir(UUID requestId, char *namep, VDiskInode *inodep)—Update the target directory's entry for the target 'namep' to point to the file handle for the inode specified by inodep. Then drop all locks on inodep's file handle, and return. This call requires that a prepareRenameOperand call have been previously made with this requestId to this server.

VDisk::commitRenameTargetFile(UUID requestId)—Update the target Mode associated with the request's POT 22 entry by decrementing its link count, then drop its locks and return. This call requires that a prepareRenameOperand call have been previously made with this requestId to this server.

VDisk::commitRenameSourceFile(UUID requestId, VDiskInode *targetDirp)—If we're renaming a directory, update the ". . ." pointer in the directory associated with the locked file handle (obtained via the POT 22 entry), drop the locks and return. This call requires that a prepareRenameOperand call have been previously made with this requestId to this server.

VDisk::persistentOpComplete(UUID requestId)—This operation removes the POT 22 entry tagged with requestId from the persistent operations table. To guard against this message being lost due to a poorly timed system crash, the secondary also periodically verifies that old POT 22 entries are still valid by contacting the primary vdisk with the VDisk::checkOperationStatus call to determine whether the POT 22 entry's request ID is still active.

VDisk::checkOperationStatus(UUID requestId, int *statusp)—This operation checks on the status of the transaction tagged with requestId. The value of *statusp is set, on return, to the status of the operation, that is, one of remoteSent, remoteDone, complete, or unknown. The first three are normal states recorded in a POT 22 entry, while the last indicates that there is no POT 22 entry with the specified transaction UUID.

Every operation in the vnode interface 18 has a corresponding operation in the vdisk 24 interface 18, having the same name. Most operations in the vdisk 24 interface 18 require a subset of the input parameters of the corresponding vnode operation with the same name, or return a superset of the output parameters required by the vnode operation, and so can trivially be implemented by calling the corresponding vdisk 24 operation with the underling VDiskInode object (which can even be embedded in the vnode structure used by the vnode interface 18).

The segment interface 18 provides operations for reading and writing file data, and reading and caching directory information. The following operations are provided:

Segment::read(uint64_t offset, uint32_t count, buf *datap). This call reads the data located at the specified offset, returning it in the provided buffer. Only count bytes are transferred.

Segment::write(uint64_t offset, uint32_t count, buf *datap). This call works like read, only the data is written from the start of the provided buffer.

Segment::readdir(uint64 _t offset, uin32_t count, buf *datap). This call returns a block of directory entries in a standard form from a physical offset within a directory. The data returned is an integral number of records, each giving a file name (including the file name's length in bytes), and the 64 bit Mode number within the vdisk 24 of the file.

Note that these calls can be executed as local calls to access drives connected to the same computer system as the caller, or as remote procedure calls to access drives connected to other computer systems.

This invention provides two significant advantages over the state of the art today in file systems. First, the invention provides a much more flexible mechanism for changing the class of service of files, and even portions of files, than traditional file systems, both with directed attached storage and network attached storage systems. By class of service, we mean without restriction any property of the storage such as transfer rate, request latency, reliability or expense. Second, the invention provides a significantly simpler administrative model for file systems that can be serviced by multiple processes, for example, on a multiprocessor or on multiple systems in a clustered server. Because the invention divides a file system into an arbitrarily large number of independently servable and individually repairable components automatically, rather than by requiring the administrator to define a set of volumes, the administrative model is much simpler, and the resulting system is much easier to service.

For example, with this invention, an administrator could specify a policy where the first megabyte of every file would be located on segments having very low latency, perhaps comprised of very fast disks 20 or flash memory 12. The remaining blocks would be allocated from normal storage vdisks 24. With an operations mix that chooses files at random and then reads each chosen file sequentially, this policy would reduce overall latency to the data in these files, since the first portion of the data would be accessible at very low latency, and during the transfer of this first portion of the data, the remaining data could be accessed from drives with a higher latency.

In many of today's storage systems, there are several options for changing the class of service of stored data. Systems like IBM's AFS, the Open Software Foundation's DCE/DFS, NetApp's Ontap GX, and Sun's ZFS provide a mechanism for moving volumes, representing subtrees of the file system name space, from one storage area to another. When the two storage areas provide different classes of storage, the administrator effectively changes the class of storage for the relevant subtree when moving the volume from one area to another. This invention improves upon this art in several ways. First, volume boundaries are administratively difficult to adjust after the creation of the volumes, while this invention does not have a comparable volume concept whose boundaries might need adjustment to match the desired class of service boundaries. Instead, this invention provides multiple classes of storage within the block address space used by a single pool of inodes (a vdisk 24), so that any file can be moved to storage with a new class of storage at any time, without changing where it resides in the file system name space. Second, class of service policies that adjust the class of service for data stored in a file system, in this invention, can make adjustments on a block-by-block basis. The above systems would all need to relocate an entire volume to make any class of service adjustments, and would furthermore be unable to make any adjustments at any granularity below that of an entire directory and its contents, while this invention can adjust data's class of service on a file by file, or even a block by block basis.

In terms of administrative model simplicity, again, comparing this invention with volume-based data architectures, this invention has the advantage that no volume boundaries have to be chosen at all—instead, data is randomly distributed among vdisks 24. The class of service of the storage is associated not with the specific vdisk chosen, but with the type of segment storing the data within a particular vdisk 24.

In the realm of serviceability, instead of having to run disk consistency checks over the entire file system, or over a single volume, both administratively visible concepts, in the invention, disk consistency checks are run over individual vdisks 24. Vdisks 24 are not individually managed by administrators, so that having many vdisks 24 making up an individual file system does not add administrative complexity to the system management task.

In terms of meta data scalability, this invention improves on the state of the art for a global name space in a number of ways. As compared with a name space with a meta data synchronization server, such as Red Hat's (originally Sistina's) GFS, this system performs indirect block updates completely within an individual vdisk 24, without any communication with other vdisks 24. This system also performs directory updates on at most two vdisks 24 (except for the infrequently executed rename operation, which typically involves one vdisk 24, but can in some complex cases involve up to four). When multiple vdisks 24 collaborate on a single directory operation, they do so by exchanging a small number of messages among themselves (as described above), where each individual operation actually executes on a single vdisk 24. Since operations on each vdisk 24 can be performed by separate processors 26 without any references to data structures controlled by other vdisks 24, this architecture allows significant global file system scaling without requiring a meta data server acting as a synchronization point, via the splitting of an active file system into a moderately large number of vdisks 24. Thus, because files are distributed among vdisks 24 automatically, a single name space can be distributed among multiple processors 26 without any manual administrative intervention.

As compared with systems like IBM's AFS, the OSF's DCE/DFS and NetApp's Ontap/GX, which divide the global file system into a number of independent subtrees (volumes), this invention's scalability benefits come from its ability to divide the files within a given directory into a number of vdisks 24, all of which can be processed independently (as opposed to the above systems, which require that all files within a single directory reside in a single volume, and thus be served by a single processor 26 system.) In addition, because vdisk 24 creation and deletion can be automated much more easily than volume creation and deletion (since the latter requires an administrator's choosing the volume boundaries in the global name space), this invention allows for the creation of many more vdisks 24 than the above systems, allowing automatic load balancing algorithms more flexibility to smoothly distribute vdisks 24 across processors.

In terms of class of service management (CoS), this invention is believed to improve on the state of the art in a number of ways. The state of the art in CoS management has been to relocate volumes in designs such as AFS, DCEIDFS and Ontap/GX from underlying storage with one class of service to underlying storage having a different class of service. The weaknesses of this approach are that the granularity of the data whose CoS is changed is that of an entire volume, that all of the data within the volume are copied in order to change the CoS of any of the data, and that the volume boundaries are chosen initially to match the boundaries at which the administrator, sometime in the future, will require for CoS updates. Changing volume boundaries after volume creation is both complicated and difficult to do while the data is being accessed by clients concurrently, since file handles held by client systems include a volume ID as part of that file handle. This means that operations changing volume boundaries will change client resident file handles, limiting the transparency of those operations. This invention, on the other hand, determines the CoS for an individual block of a file by choosing the appropriate segment from which to allocate the block, and thus operates at a lower level of abstraction than file handles. No administrative boundaries need to be determined or changed before changing a CoS policy. Furthermore, if new data with a different class of service becomes available, it can be divided into a number of segments, and each segment can be joined to existing vdisks 24 automatically, providing convenient access to the new type of storage for existing files. A new policy could then specify which blocks of which files should use the new storage, and that new storage could be automatically used for newly written files, while in the background, files conforming to the new policy could have their data migrated into the new. In this case, in other words, the ability to dynamically add new segments to a vdisk's block address space, combined with invention's ability to allocate and reallocate file data from any of a vdisk's segments, allows a very inexpensive CoS management mechanism that can specify different classes of service at a very fine level of granularity (that of individual blocks in a file), and that can also change the class of service of an existing file continuously in the background, also on a block by block basis.

A glossary of various terms used here follows.

Chunk—A fixed sized, contiguous portion of a single disk. Chunks may store data or checksum/parity information. Multiple chunks sharing the same class of service, or basic attributes, are concatenated into segments, a variable sized piece of storage.

File attributes—Meta data information describing the properties of a file, including the file's length in bytes, the user ID of the owner of the file, the file's last accessed time, last modified time and last "attributes modified" time.

Persistent Operations Table (POT 22)—A per-vdisk table tracking the progress of atomic file system operations that affect a single VFS, but one or more vdisks 24. For example, a file create or delete may affect a directory stored within one vdisk 24, and a file stored within another vdisk 24 in the same virtual file system. The persistent operations table on each vdisk 24 keeps track of the progress of each such file system operation. All entries describing the progress of a single atomic operation are tagged with the same operation UUID.

RAID array—An array of physical disks grouped together with some form of RAID parity scheme, and storing a number of fixed sized chunks.

Segment—A variable length collection of a number of chunks, all sharing the same type of storage, for example, RAID 1 storage comprised of 15K RPM disk drives. A segment can be addressed internally by a virtual 64 bit block pointer; these addresses only map to the data chunks of a segment, not the parity chunks. The virtual addresses are all contiguous within a single segment, but the underlying physical addresses of the individual chunks of which the segment is made may be scattered throughout the disks 20 attached to a computing system.

Segment Interface—A simple interface providing operations to read and write data stored in a segment.

UUID—Universal Unique IDentifier, a 128 bit, easy to construct identifier that is unique over all systems and all time. Typically, these are constructed using the IEEE 48 bit hardware address of some card in the computing system, combined with a very fine granularity clock value, and a process ID and/or boot counter.

VDisk—An arbitrary collection of Modes, not connected as a single file system tree, storing its data and meta data in a dedicated collection of segments. The different segments within a vdisk 24 may have different properties, e.g. RAID levels, transfer rates, etc, and individual files may be allocated entirely from one segment within a vdisk 24, or from multiple segments, depending upon externally provided policies. For example, one possible policy might be to place all meta data in a RAID 1 vdisk, and put all user data in a RAID 5 vdisk. Another possible policy might be to store the first megabyte of every file in a segment having very low latency (perhaps comprising flash memory 12), with the remaining blocks allocated from normal RAID 5 storage, so that reading random medium-sized files in their entirety could be done with very low overall latency. One or more vdisks are combined to create a VFS, or file system.

VDisk Interface—An interface used in this invention to perform file system modifying operations on files stored in vdisks 24 making up a single VFS. The key new functionality in the vdisk interface allows directory operations to change objects in more than one vdisk, by beginning execution at one of the vdisks 24, which then forwards subsidiary requests to the other vdisk(s) involved in the operation on a secondary interface 18.

VDisk Primary Interface—The primary interface used by components such as the local NFS server to access files stored in the vdisks 24 making up a VFS. For each VFS operation, there is a corresponding vdisk operation, with slightly different parameters, as described in the section above on the VDisk interface.

VDisk Secondary Interface—The interface invoked by those vdisk primary interface operations that update objects on more than one vdisk, to effect changes to those objects on the other vdisks 24. For example, the secondary vdisk interface includes an operation to allocate an inode, which is invoked by the primary vdisk file create operation. Most operations in the secondary interface create POT 22 entries to ensure that their changes occur atomically with respect to the invoking primary interface operation.

VFS or Virtual File System. A collection of files and directories stored in one or more vdisks 24, and making up together a connected file system tree, with a root directory and a collection of subdirectories, each containing other files and subdirectories. A VFS contains a number of vdisks 24, and each vdisk is a member of exactly one VFS.

VFS Interface—A reasonably standard interface to virtual file systems, first introduced in the 1980s by Sun Microsystems in the SunOS 3.X operating system, and today present in some form in many Unix and Linux-based kernels, including Sun's OpenSolaris operating system. Typical operations including reading and writing blocks within files, reading and changing file attributes, and creating and deleting files within a directory.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. A storage system comprising:
a computer;
a plurality of vdisks in communication with the computer, each vdisk containing a plurality of persistent storage segments, each segment providing a specific class of service (CoS) for storage different from the CoS for storage of the other segments; each vdisk storing one or more files with data and meta data distributed among its storage segments, each file's meta data including a search tree indexed by logical block number, each file described by a single inode, a first storage segment of the plurality of storage segments being a first disk drive having a low latency and storing a first portion of one of the files, a second storage segment of the plurality of storage segments storing a second portion of the one file being a second disk drive and having a higher latency than the first storage segment so when the computer finishes reading the first portion of the file, the second portion of the file with the second storage segment is ready to be read by the computer because the second disk drive has come up to operational speed.

2. A storage system as described in claim 1, wherein a first portion of a file's data is stored in a first segment, and a second portion of the file is stored in either the first segment or a second segment.

3. A storage system as described in claim 2 wherein a vdisk to hold a newly created file or directory is chosen from the plurality of vdisks based on a predetermined mapping into the plurality of vdisks.

4. A storage system as described in claim 3, where the predetermined mapping is a round robin assignment algorithm.

5. A storage system as described in claim 3, where the predetermined mapping chooses the vdisk with a largest available space, or a largest percentage of available space.

6. A storage system as described in claim 3, including a plurality of processors and wherein the predetermined mapping chooses the vdisk served by a least loaded processor.

7. A storage system as described in claim 2, wherein each vdisk contains an arbitrary collection of directories and files, and at least two vdisks hold at least one file.

8. A storage system as described in claim 2, wherein each vdisk contains meta data disk block pointers only to blocks within a same vdisk.

9. A storage system as described in claim 8, including an interface to initiate a file system consistency check on an individual vdisk, triggered by an indication of an inconsistency in a specific vdisk.

10. A storage system as described in claim 1, wherein at least one file's data is stored in one segment, and at least one other file's data is stored in a second segment.

11. A storage system as described in claim 10, including a plurality of vdisks, and where a vdisk to hold a newly created file or directory is chosen from the plurality of vdisks based on a predetermined mapping into the plurality of vdisks.

12. A storage system as described in claim 11, where the predetermined mapping is a round robin assignment algorithm.

13. A storage system as described in claim 11, where the predetermined mapping chooses the vdisk with a largest available space, or a largest percentage of available space.

14. A storage system as described in claim 11, including a plurality of processors and wherein the predetermined mapping chooses the vdisk served by a least loaded processor.

15. A storage system as described in claim 2, wherein each vdisk is an arbitrary collection of directories and files, and at least one file is stored in at least two segments.

16. A storage system as described in claim 10, wherein each vdisk contains an arbitrary collection of directories and files, and at least two vdisks hold at least one file.

17. A storage system as described in claim 10, wherein each vdisk contains meta data disk block pointers only to blocks within the same vdisk.

18. A storage system as described in claim 17, including an interface to initiate a file system consistency check on an individual vdisk, triggered by an indication of an inconsistency in a specific vdisk.

19. A system as described in claim 3 wherein each segment consists of a plurality of chunks.

20. A method for storing a file comprising the steps of:
receiving the file at a communication interface;
storing a first portion of the file in a first segment of a persistent memory in communication with the interface and a second portion of the file in a second storage segment of the memory having a different class of service for storage than the first segment's class of service, the first storage segment being a first disk drive having a low latency, the second storage segment being a second disk drive and having a higher latency than the first storage segment so when the computer finishes reading the first portion of the file, the second portion of the file with the second storage segment is ready to be read by the computer because the second disk drive has come up to operational speed; and retrieving by a computer the file by reading the first portion and the second portion from the first and second segment, respectively, each file's meta data including a search tree indexed by logical block number.

21. A storage system comprising:

a computer;

a plurality of vdisks in communication with the computer, each vdisk containing a plurality of persistent storage segments, each segment providing a specific class of service (CoS) for storage different from the CoS for storage of the other segments; each vdisk storing one or more files with data and meta data distributed among its storage segments and a persistent operations table that implements directory modifying operations atomically, the meta data in at least one segment describes file data stored in any other segment, a first storage segment of the plurality of storage segments being a first disk drive having a low latency and storing a first portion of one of the files, a second storage segment of the plurality of storage segments storing a second portion of the one file being a second disk drive and having a higher latency than the first storage segment so when the computer finishes reading the first portion of the file, the second portion of the file with the second storage segment is ready to be read by the computer because the second disk drive has come up to operational speed.

22. A storage system comprising:

a computer;

a plurality of vdisks in communication with the computer, each vdisk containing a plurality of persistent storage segments, each segment providing a specific class of service (CoS) for storage different from the CoS for storage of the other segments; each vdisk storing one or more files with data and meta data distributed among its storage segments, each segment having disk blocks, the disk blocks being allocated to files and being marked as in use by a corresponding bit being set in the bitmap allocation table, indexed by physical block address, a first storage segment of the plurality of storage segments being a first disk drive having a low latency and storing a first portion of one of the files, a second storage segment of the plurality of storage segments storing a second portion of the one file being a second disk drive and having a higher latency than the first storage segment so when the computer finishes reading the first portion of the file, the second portion of the file with the second storage segment is ready to be read by the computer because the second disk drive has come up to operational speed.

* * * * *